(12) United States Patent
Wang et al.

(10) Patent No.: US 10,481,688 B1
(45) Date of Patent: Nov. 19, 2019

(54) FINGER BEAM FOR GENERATING HAPTIC FEEDBACK

(71) Applicant: Apple Inc., Cupertino, CA (US)

(72) Inventors: Paul X. Wang, Cupertino, CA (US);
Alex Lehmann, Sunnyvale, CA (US);
Michael Y. Cheung, Cupertino, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 15/709,045

(22) Filed: Sep. 19, 2017

Related U.S. Application Data

(60) Provisional application No. 62/396,751, filed on Sep. 19, 2016.

(51) Int. Cl.
*G09G 5/00* (2006.01)
*G06F 3/01* (2006.01)

(52) U.S. Cl.
CPC .............. *G06F 3/014* (2013.01); *G06F 3/016* (2013.01); *G06F 3/017* (2013.01); *G06F 2203/0331* (2013.01)

(58) Field of Classification Search
CPC ...................................................... G06F 3/016
See application file for complete search history.

(56) References Cited

U.S. PATENT DOCUMENTS

| | | | | |
|---|---|---|---|---|
| 5,583,478 A | * | 12/1996 | Renzi ...................... | G06F 3/011 340/407.1 |
| 5,631,861 A | * | 5/1997 | Kramer ................... | G06F 3/011 414/5 |
| 7,202,851 B2 | | 4/2007 | Cunningham et al. | |
| 8,279,193 B1 | | 10/2012 | Birnbaum et al. | |
| 9,606,625 B2 | | 3/2017 | Levesque et al. | |
| 2002/0021277 A1 | * | 2/2002 | Kramer ................... | G06F 3/016 345/156 |
| 2003/0234823 A1 | * | 12/2003 | Sato ........................ | G06F 3/013 715/848 |
| 2015/0130323 A1 | | 5/2015 | Harris et al. | |
| 2017/0168576 A1 | * | 6/2017 | Keller ...................... | G06F 3/016 |

OTHER PUBLICATIONS

Wang et al., U.S. Appl. No. 15/629,619, filed Jun. 21, 2017.

* cited by examiner

*Primary Examiner* — Nan-Ying Yang
(74) *Attorney, Agent, or Firm* — David K. Cole

(57) ABSTRACT

According to some embodiments, a haptic feedback component is configured to generate haptic feedback in accordance with movement of a user. The haptic feedback component includes a frame having a size and shape for receiving an appendage of a user, a flexible beam member coupled to the frame, and a haptic feedback element that is coupled to the flexible beam member, wherein the haptic feedback element actuates in response to receiving an electrical signal so as to cause the flexible beam member to displace from an initial configuration to a modified configuration such as to direct the haptic feedback towards the appendage.

20 Claims, 15 Drawing Sheets

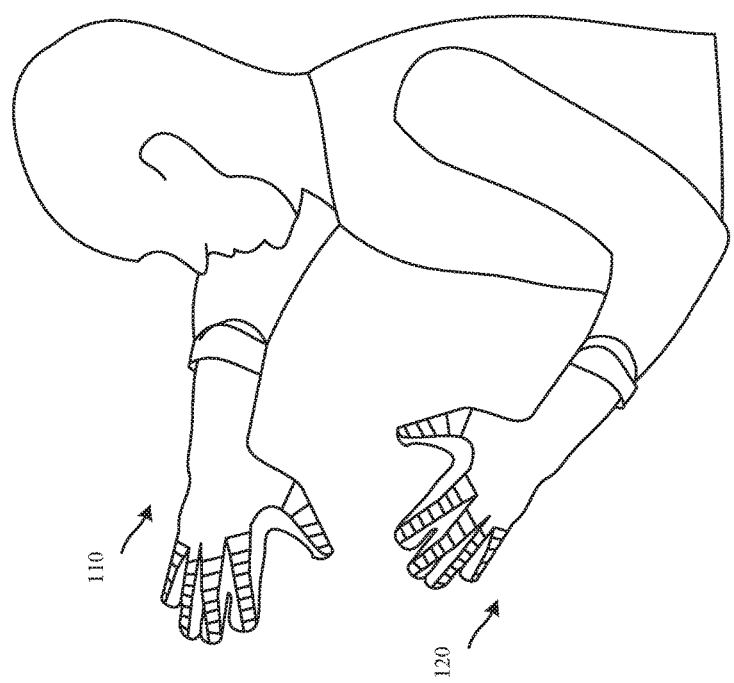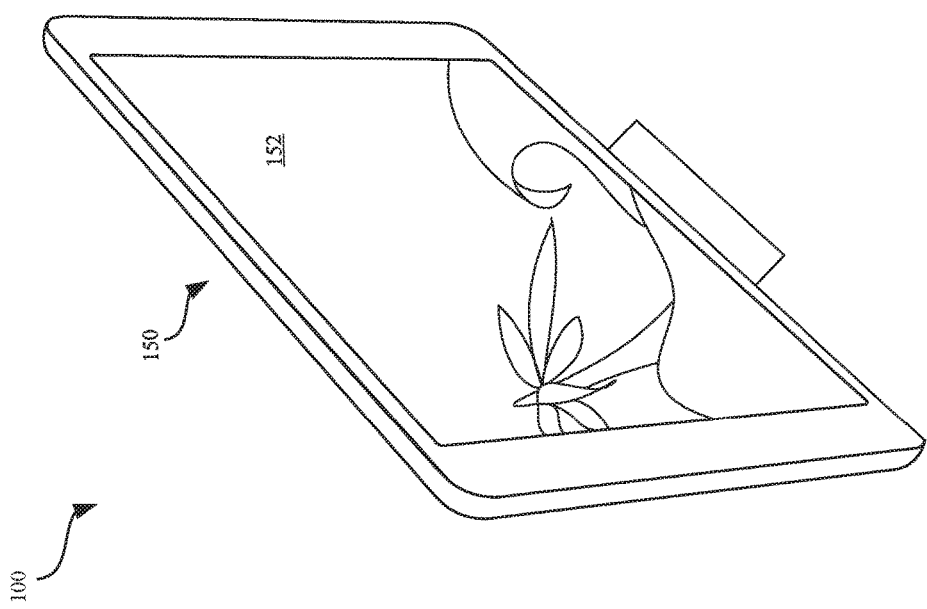
FIG. 1

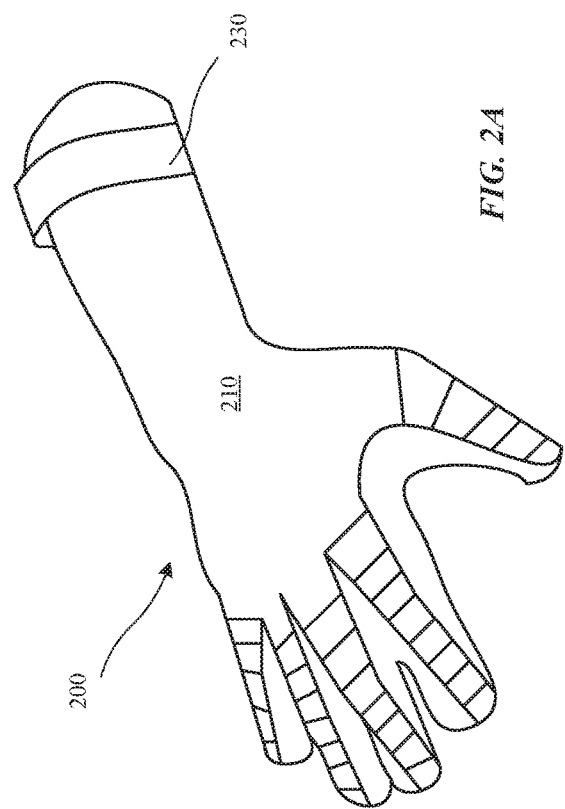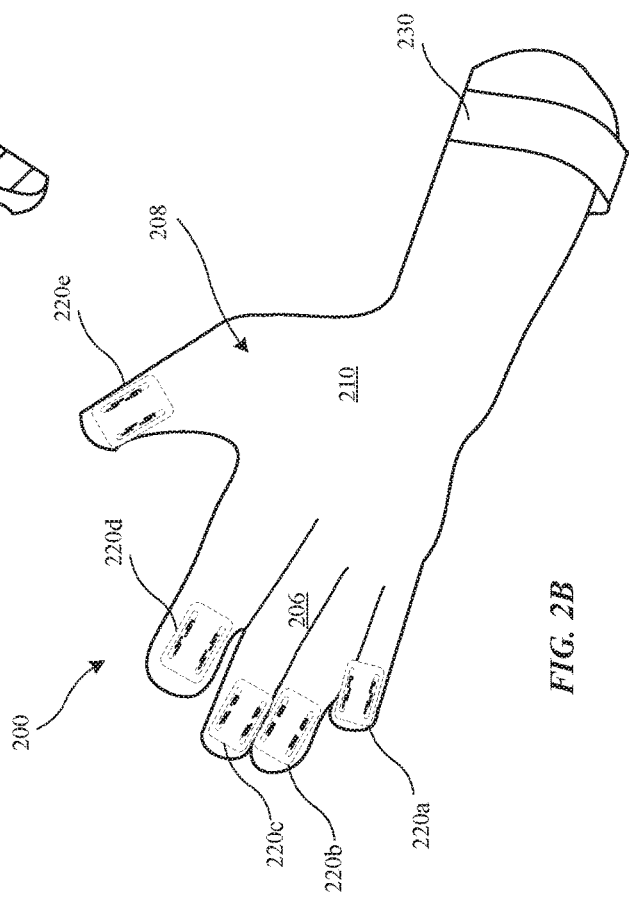

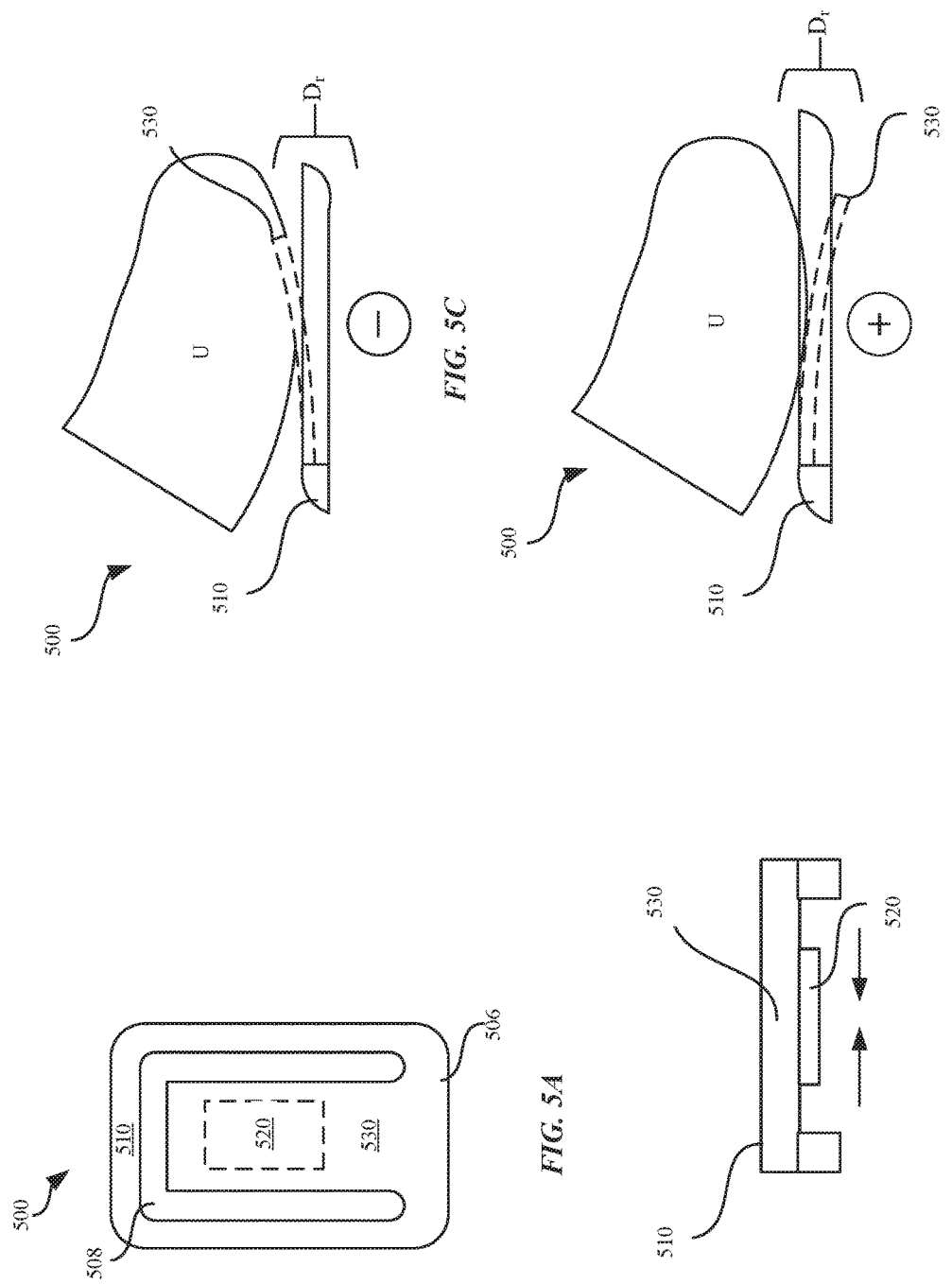

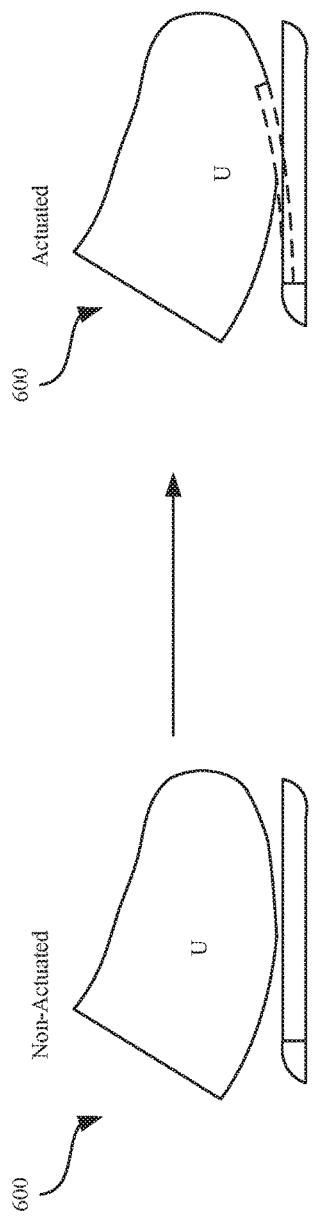
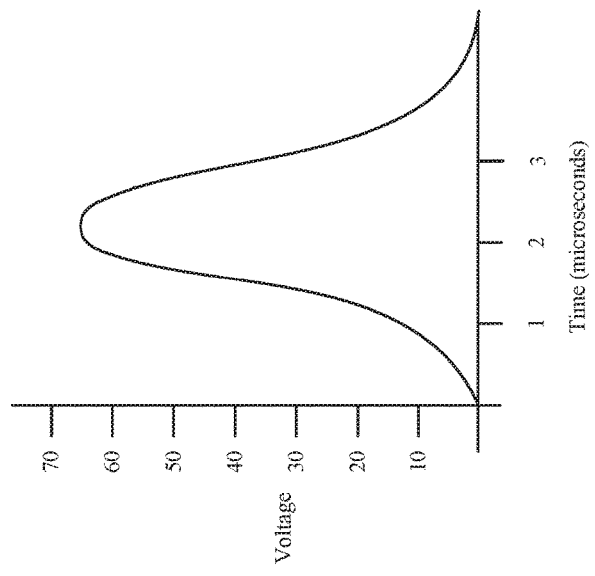
FIG. 6A
FIG. 6B
FIG. 6C

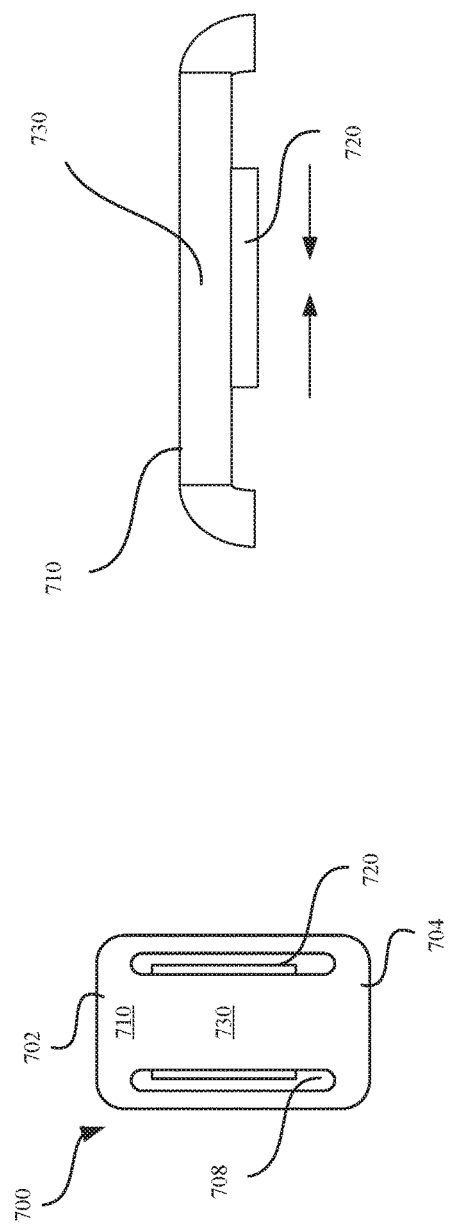
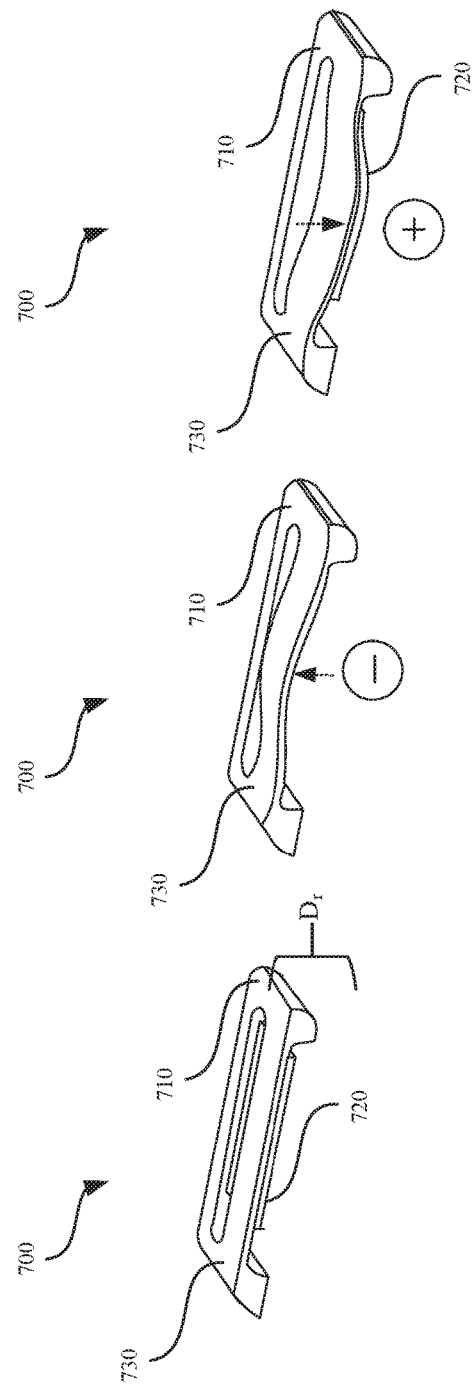

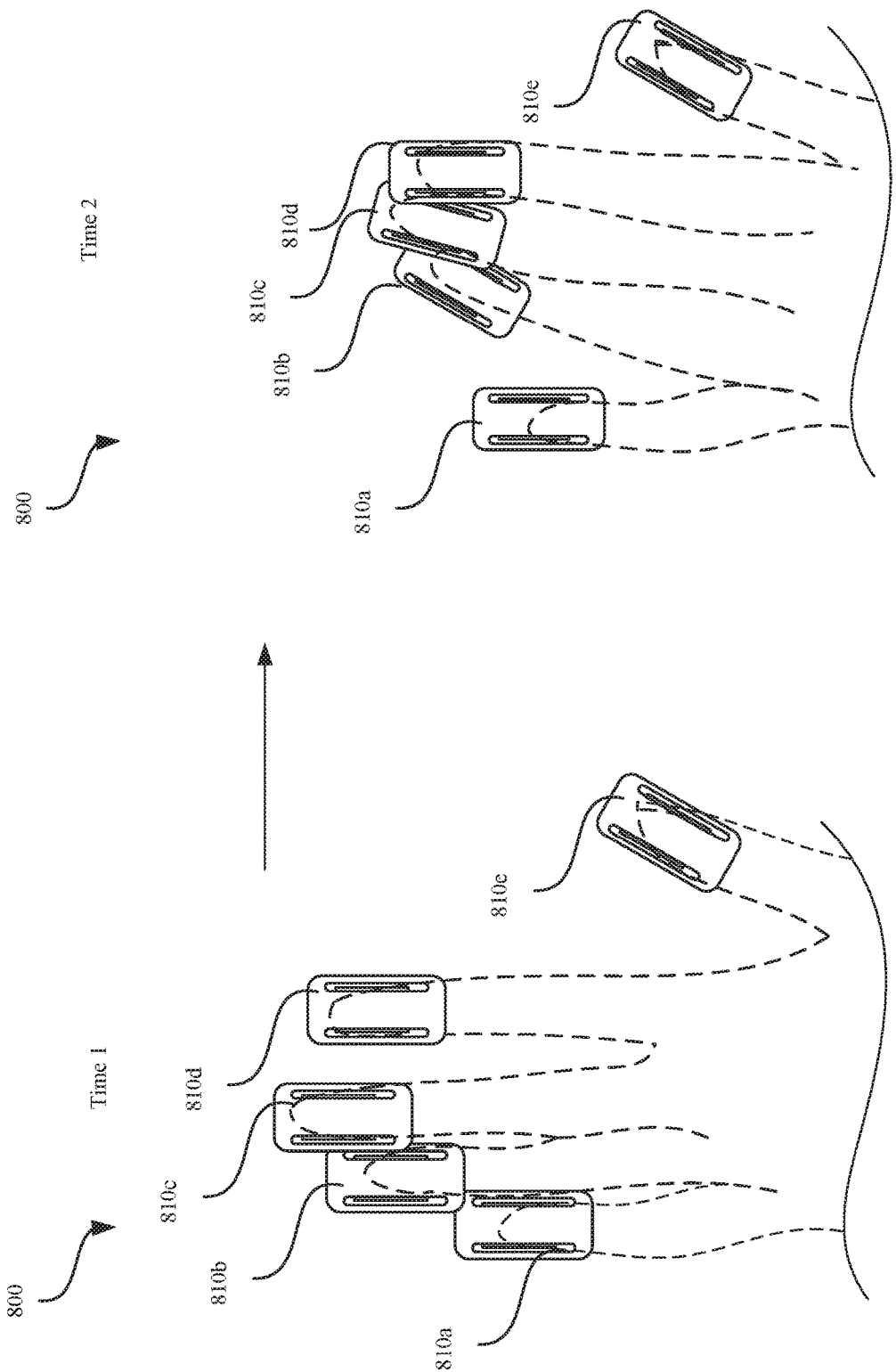

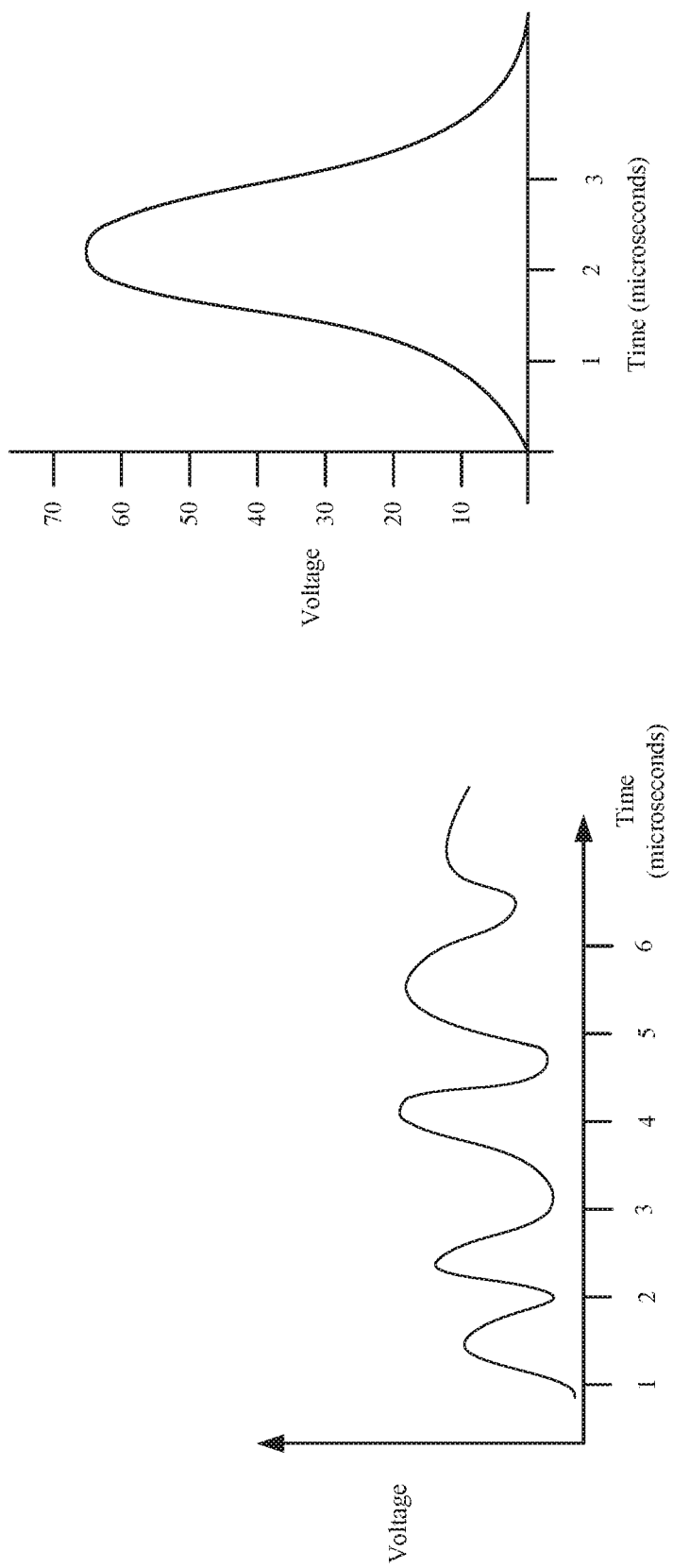

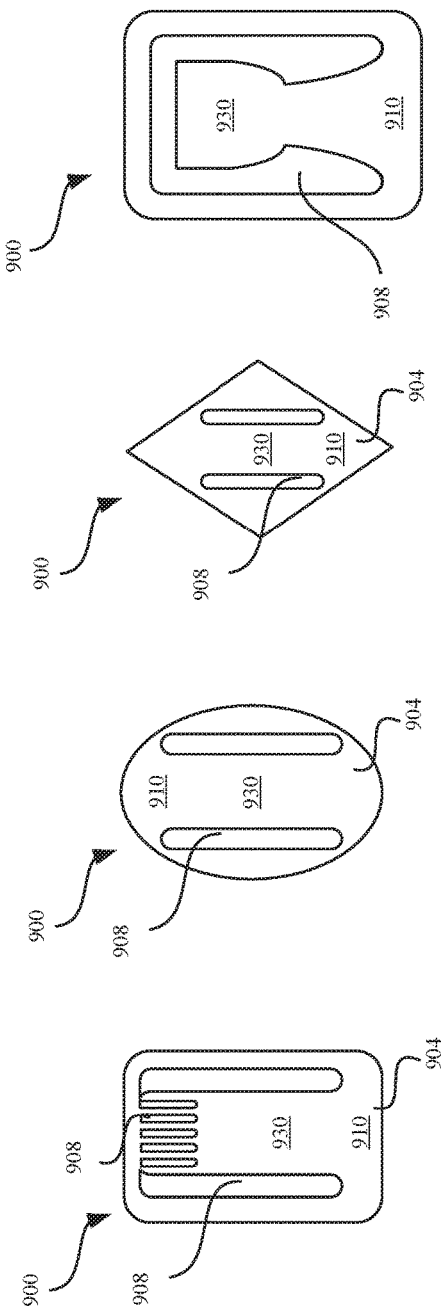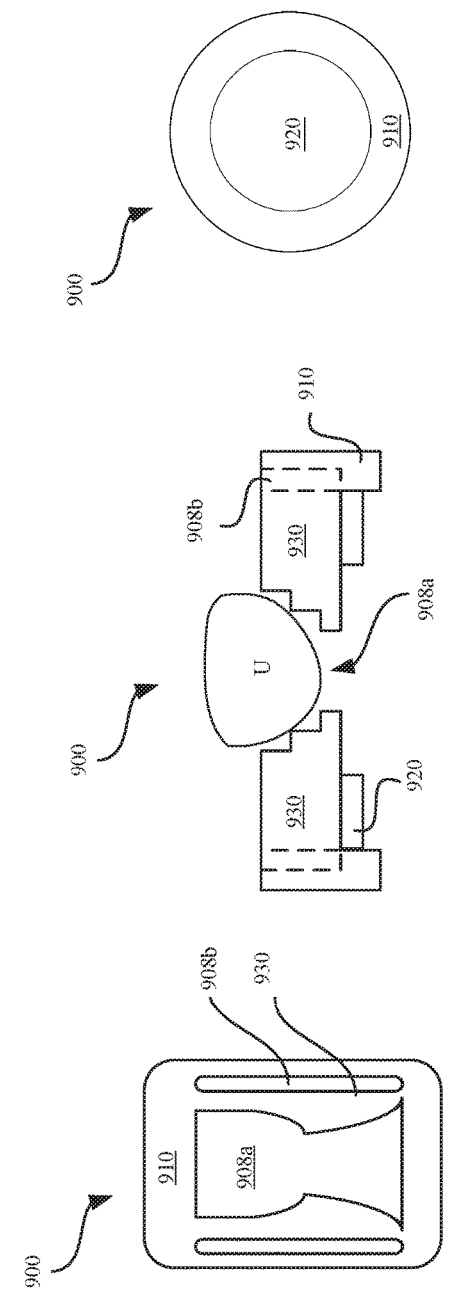

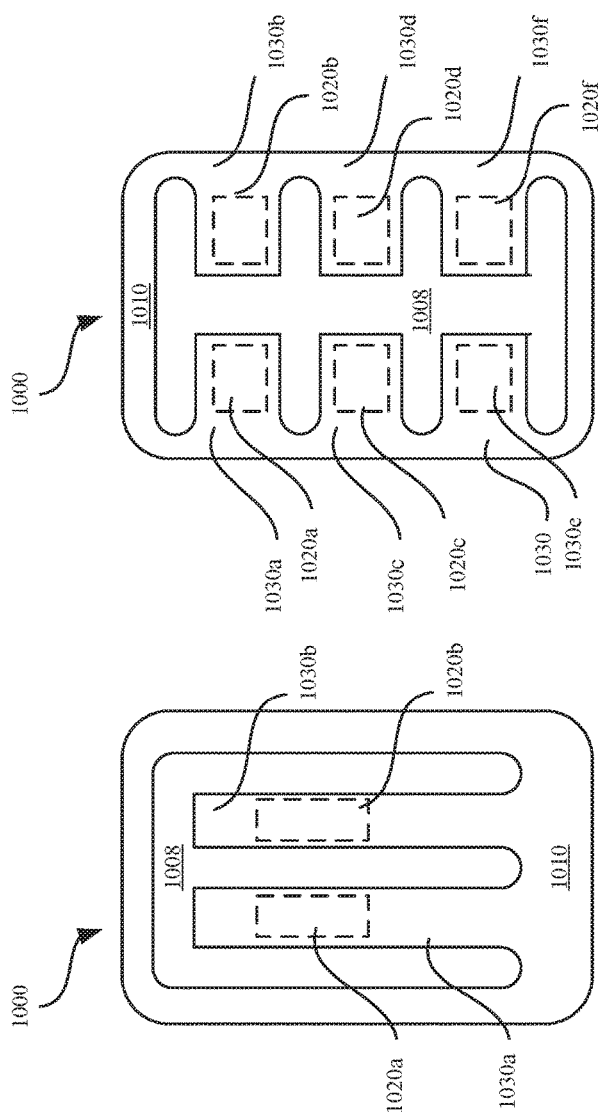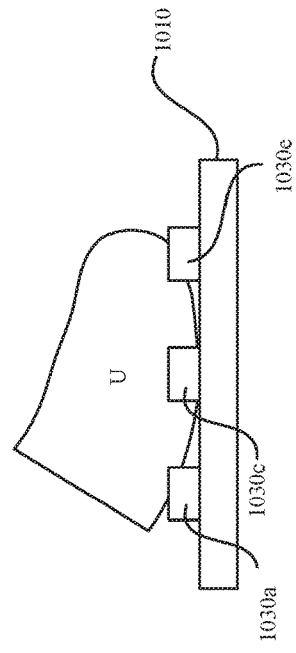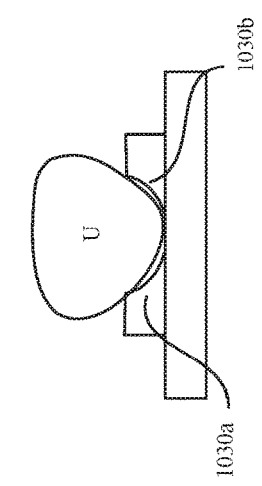

FINGER BEAM FOR GENERATING HAPTIC FEEDBACK

This application claims priority to U.S. provisional patent application No. 62/396,751, filed Sep. 19, 2016, which is hereby incorporated by reference herein in its entirety.

FIELD

The described embodiments relate to an electronic haptic device that can be worn by a user or implemented in an electronic device. Specifically, the haptic device can generate haptic feedback in conjunction with detecting user movement.

BACKGROUND

Portable electronic devices can incorporate a display to provide an immersive multimedia experience. However, despite advancements made to render objects in increasingly more accurate and realistic detail, portable electronic devices are still unable to provide an element of physical interaction with a user. Accordingly, there is a need to enhance the user's experience by utilizing a haptic feedback device to generate haptic feedback that corresponds to a user's movements in order to provide an additional level of realism.

SUMMARY

This paper describes various embodiments related to an electronic haptic device that can be worn by a user or implemented in an electronic device. Specifically, the haptic device can generate haptic feedback in conjunction with the user movement.

According to some embodiments, a haptic feedback component for generating haptic feedback can include a frame having a size and shape for receiving an appendage of a user, a flexible beam member coupled to the frame, and a haptic feedback element that is coupled to the flexible beam member, wherein the haptic feedback element actuates in response to receiving an electrical signal so as to cause the flexible beam member to displace from an initial configuration to a modified configuration in order to direct the haptic feedback towards the appendage.

According to some embodiments, a wearable haptic device for generating haptic feedback according to movement of an appendage of a user is described. The wearable haptic device includes an enclosure that defines an internal cavity having a size and shape to receive the appendage, a controller that is configured to generate a feedback parameter based on the movement of the appendage, an electrode that is configured to generate an electrical signal based on the feedback parameter, and a haptic feedback component carried within the internal cavity, wherein the haptic feedback component is configured to displace from an initial configuration to a modified configuration upon receiving the electrical signal, thereby generating the haptic feedback towards the appendage so as to be perceived by the user.

According to some embodiments, a method for generating haptic feedback at a controller of a haptic feedback device is described. The method includes receiving a motion parameter from a sensor, generating a feedback parameter based on the motion parameter, and actuating a haptic feedback component from an initial configuration to a modified configuration so as to generate the haptic feedback based on the motion parameter.

The described embodiments may be better understood by reference to the following description and the accompanying drawings. Additionally, advantages of the described embodiments may be better understood by reference to the following description and accompanying drawings.

BRIEF DESCRIPTION OF THE DRAWINGS

The disclosure will be readily understood by the following detailed description in conjunction with the accompanying drawings, wherein like reference numerals designate like structural elements, and in which:

FIG. 1 illustrates a perspective view of a system for generating haptic feedback, in accordance with some embodiments.

FIGS. 2A-2B illustrates perspective views of a wearable haptic apparatus for generating haptic feedback, in accordance with some embodiments.

FIGS. 5A-5D illustrate various views of a haptic feedback component in accordance with some embodiments.

FIGS. 6A-6C illustrate various views of a haptic feedback component and a timing diagram associated with actuating the haptic feedback component from an initial configuration to a modified configuration, in accordance with some embodiments.

FIGS. 7A-7E illustrate various views of a haptic feedback component in accordance with some embodiments.

FIGS. 8A-8D illustrate perspective views and schematic diagrams of a system for using haptic feedback components to generate haptic feedback, in accordance with some embodiments.

FIGS. 9A-9G illustrate various views of several embodiments of a haptic feedback component that can be implemented to perform the techniques described herein.

FIGS. 10A-10D illustrate various views of several embodiments of a haptic feedback component.

Figure 3:
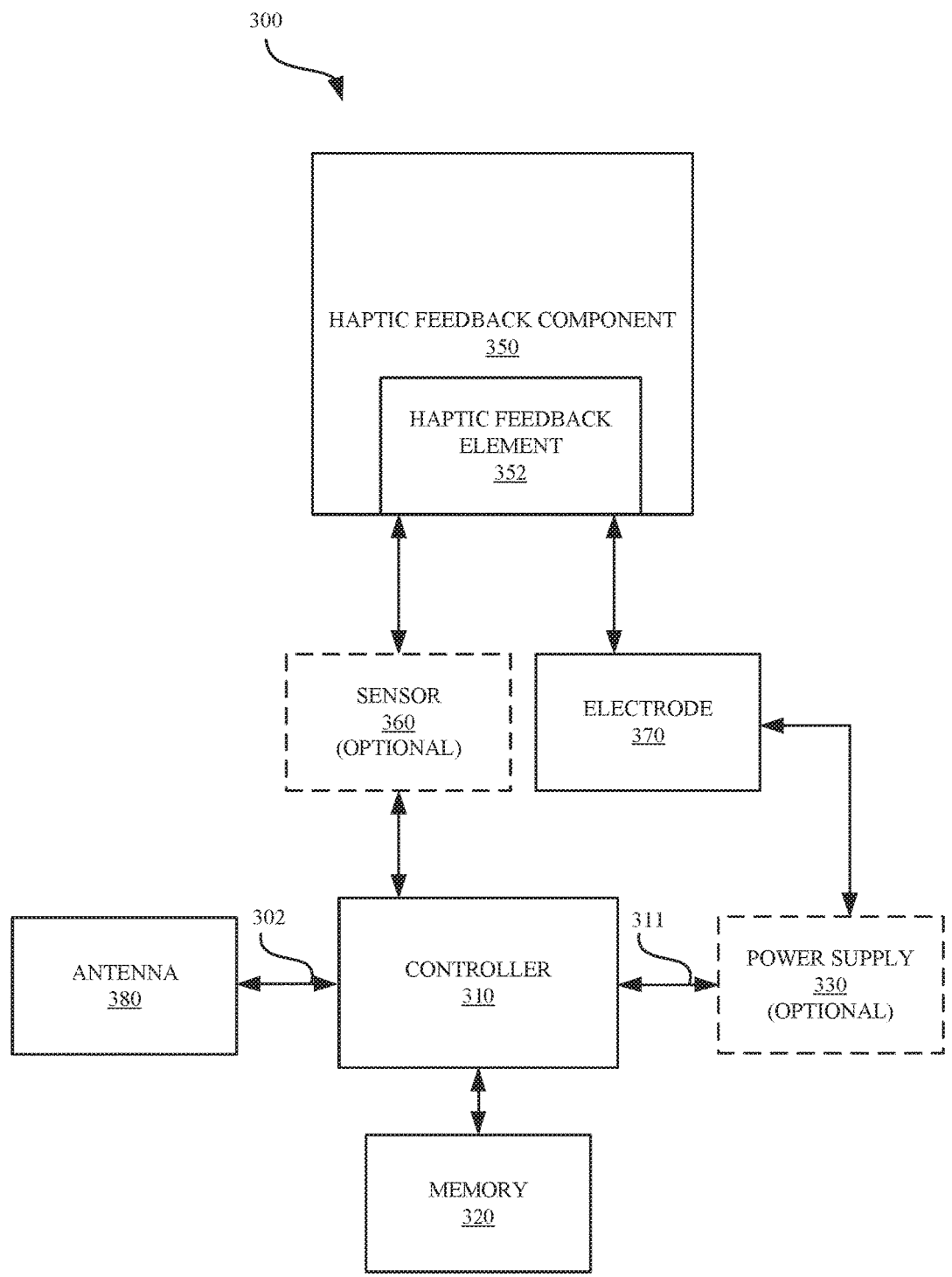
FIG. 3 illustrates an electronic haptic device for generating haptic feedback, in accordance with some embodiments.

Those skilled in the art will appreciate and understand that, according to common practice, various features of the drawings discussed below are not necessarily drawn to scale, and that dimensions of various features and elements of the drawings may be expanded or reduced to more clearly illustrate the embodiments of the present invention described herein.

DETAILED DESCRIPTION

The following disclosure describes various embodiments of an electronic haptic device that can be worn by a user, and techniques for generating haptic feedback in conjunction with movement of the user. Certain details are set forth in the following description and figures to provide a thorough understanding of various embodiments of the present technology. Moreover, various features, structures, and/or characteristics of the present technology can be combined in other suitable structures and environments. In other instances, well-known structures, materials, operations, and/or systems are not shown or described in detail in the following disclosure to avoid unnecessarily obscuring the description of the various embodiments of the technology. Those of ordinary skill in the art will recognize, however, that the present technology can be practiced without one or more of the details set forth herein, or with other structures, methods, components, and so forth.

According to some embodiments, a haptic feedback component for generating haptic feedback can include a frame having a size and shape for receiving an appendage of a user, a flexible beam member coupled to the frame, and a haptic feedback element that is coupled to the flexible beam member, wherein the haptic feedback element actuates in response to receiving an electrical signal so as to cause the flexible beam member to displace from an initial configuration to a modified configuration such as to direct the haptic feedback towards the appendage.

The system and methods described herein can be implemented in portable electronic devices, touch sensitive devices, wearable electronic devices, watches, cases for electronic devices, gloves, headsets, wearable apparel, consumer devices, and general electronic devices, such as those manufactured by Apple Inc., based in Cupertino, Calif.

FIG. 1 illustrates a perspective view of a system 100 for generating haptic feedback by a wearable haptic apparatus 110. In some embodiments, the wearable haptic apparatus 110 can refer to gloves or mittens that can be worn around a user's hand. As described herein, haptic feedback can refer to actuating a haptic feedback element to selectively stimulate the nerves within a user's body part (e.g., fingers). Haptic feedback can simulate a sensation of touch feedback by applying force, vibrations, pulses, regular or irregular movements, or other motions that can be perceived by the user.

In some embodiments, the wearable haptic apparatus 110 can be configured to electronically communicate or interact with an electronic device 150 so that the wearable haptic apparatus 110 can determine the haptic feedback to be generated. In some embodiments, the electronic device 150 can include a display 152 that can be configured to present visual stimuli and audio stimuli to the user. In some embodiments, the user can be configured to interact with the visual stimuli by using the wearable haptic apparatus 110. For example, as shown in FIG. 1, the display 152 presents a virtual reality game that can be played by the user. The display 152 can depict a beach scene that shows an ocean, waves, trees, and sand. A haptic feedback component 120 of the wearable haptic apparatus 110 can be configured to generate haptic feedback that simulates the differences in the different textures, sensations, and perceptions associated with the ocean, waves, trees, and sand. In one example, while the user is watching the display 152 and perceiving that he is running his fingers through sand, the haptic feedback component 120 can be configured to receive instructions from the electronic device 150 that causes the haptic feedback component 120 to provide a continuous sequence of electrical pulses having a repeating waveform that simulates the rough texture of the sand. In another example, while the user is watching the display 152 and perceiving that a light spray of water is hitting his fingers, the haptic feedback component 120 can be configured to receive instructions from the electronic device 150 that causes the haptic feedback component 120 to provide a single electrical pulse to simulate a quick drops of water. In this manner, the wearable haptic apparatus 110 can rely upon instructions generated by the electronic device 150 that determines the haptic feedback to be perceived by the user. However, in other embodiments, the wearable haptic apparatus 110 can self-generate haptic feedback (i.e., without receiving haptic feedback instructions from the electronic device 150) while the user interacts in another environment as will be described in greater detail.

In some embodiments, the electronic device 150 can be configured to execute a media application (e.g., via an operating system established on the electronic device 150). In one example, the media application can be configured to receive a selection of a haptic feedback preference that can be transmitted to the wearable haptic apparatus 110 to be utilized in generating the haptic feedback. Specifically, the media application can be configured to transmit the haptic feedback preference to a controller (not illustrated) of the wearable haptic apparatus 110, as described in more detail with reference to FIG. 12. In other embodiments, an operating system can be established on the wearable haptic apparatus 110 that is configured to execute the media application that is configured to receive a selection of a haptic feedback preference to be used in generating the haptic feedback.

In some embodiments, the wearable haptic apparatus 110 can be configured to generate haptic feedback in accordance with a change in a motion parameter that is detected by a sensor (not illustrated) of the wearable haptic apparatus 110 or another sensor external to the wearable haptic apparatus 110. For example, the external sensor can be a 2-dimensional camera, 3-dimensional camera, or optical system that can be positioned in the same environment (e.g., the same room) as the wearable haptic apparatus 110. In some examples, the motion parameter can refer to at least one of distance ($D_1$) of the user's appendage, acceleration ($A_1$) of the user's appendage, velocity ($V_1$) of the user's appendage, force ($F_1$) of the user's appendage, an angle ($\theta_1$) of the user's appendage, change in position ($\Delta_{1-2}$) of the user's appendage, and rotation (e.g., 6-DOF) of the user's appendage. In some embodiments where another sensor external to the wearable haptic apparatus 110 is utilized to detect a change in a motion parameter, the wearable haptic apparatus 110 can include an antenna that is configured to communicate with the another sensor for generating the haptic feedback.

FIGS. 2A-2B illustrates various perspective views of a wearable haptic apparatus 200, in accordance with some embodiments. FIG. 2A illustrates an overhead view of the wearable haptic apparatus 200, while FIG. 2B illustrates an underside view of the wearable haptic apparatus 200.

The wearable haptic apparatus 200 includes an enclosure 210 having an internal surface 206 that defines an interior cavity 208. The interior cavity 208 can be characterized as having a shape and size configured to receive a user's appendage (e.g., wrist, arm, finger, etc.). Within the interior cavity 208, one or more haptic feedback components 220a-e can be included on the internal surface 206 of the enclosure 210. As shown in FIGS. 2A-2B, the wearable haptic apparatus 200 is a glove that includes a number of elongated compartments within the interior cavity 208 that have a shape and size to receive each of the user's fingers. In some embodiments, each of the haptic feedback components 220a-e corresponds to each of the user's fingertips.

In some embodiments, the haptic feedback components 220a-e can be electrically connected to one or more electrodes (not illustrated) that are configured to transmit an input voltage to the one or more electrodes as provided by a power supply (not illustrated). In some examples, the electrodes, power supply, and haptic feedback components 220a-e can be electrically coupled via wires or lines. In some examples, the haptic feedback components 220a-e can be wirelessly actuated. In some embodiments, the haptic feedback components 220a-e can be individually actuated to generate haptic feedback. In some examples, two or more of the haptic feedback components 220a-e can be concurrently actuated. In other examples, each of the haptic feedback components 220a-e can be individually and sequentially actuated over a period of time according to a pre-determined order, regular order, or at random.

In some embodiments, the wearable haptic apparatus 200 includes a preload tensioning mechanism 230 that cooperates with the enclosure 210 to cause the internal surface 206 of the enclosure 210 to apply an amount of preload between the user's appendage (e.g., finger, wrist, arm) and the haptic feedback components 220a-e. In various embodiments, the preload tensioning mechanism 230 is configured to cause the wearable haptic apparatus 200 to maintain both axial and radial position of the user's appendages relative to the haptic feedback components 220a-e in order to determine accurate displacement of the user's appendages relative to the haptic feedback components 220a-e. The preload tensioning mechanism 230 can also increase bearing rigidity, prevent sliding of the user's appendage relative to the haptic feedback components 220a-e, and maintain a relative pressure and position of the haptic feedback components 220a-e to the user's appendage. In this manner, the preload tensioning mechanism 230 is able to maintain each of the users appendages within the elongated compartments that carry the haptic feedback components 220a-e despite vigorous movement by the user.

For example, as shown in FIGS. 2A-2B, the preload tensioning mechanism 230 can be an elastic strap or stretchable band that can be tightened around the user's wrist in order to secure a tight and compliant fit between the user's appendage and the internal surface 206 of the enclosure 210. In some examples, the elastic strap or stretchable band is generally made from an elastomer (e.g., rubber). In some examples, the preload tensioning mechanism 230 can be configured to circumferentially wrap around the enclosure 210 so as to provide an increased amount of preload tension.

In some examples, the preload tensioning mechanism 230 is associated with a hook and loop fastening mechanism, where the preload tensioning mechanism 230 is a strap having a hook portion that is configured to releasably couple to a loop portion included on the enclosure 210. In other examples, the preload tensioning mechanism 230 is a strap having a loop portion that is configured to releasably couple to a hook portion included on the enclosure 210.

In some examples, the preload tensioning mechanism 230 is associated with a magnetic fastening mechanism, where a first magnetic element is included within an internal cavity of a strap or included externally along a surface of the strap. The first magnetic element of the strap can be configured to releasably couple to a second magnetic element included on the enclosure 210. In some examples, the first and second magnetic elements can have mating surfaces that each having opposing polarities that enable the first and second magnetic elements to be attracted to one another so as to cause the magnetic strap to be magnetically coupled to the enclosure 210.

In some examples, the preload tensioning mechanism 230 is a strap having a clasp, clip, or a button that is configured to releasably couple to a fastener included on a surface of the enclosure 210.

In some embodiments, the enclosure 210 can be configured to provide an interference fit or a friction fit between the internal surface 206 of the enclosure 210 and the user's appendage. In conjunction with increasing an amount of compression between the internal surface 206 and the user's appendage, the amount of the friction fit is increased. In some examples, increased user movement can increase the amount of the friction fit.

In some examples, the internal surface 206 can include foam or other compliant material that is configured to generate a sufficient amount of preload between the user's appendage and the internal surface 206.

In some examples, the preload tensioning mechanism 230 can refer to a pneumatic gas chamber that is configured to generate an air vacuum or suction within the enclosure 210 so as to generate a sufficient amount of preload between the user's appendage and the internal surface 206. The pneumatic gas chamber can adjust the amount of air within the enclosure 210 so as to provide varied degrees of fit and comfort for the user's appendage.

In some examples, the wearable haptic apparatus 200 can be manufactured from a breathable material or include ventilation holes to facilitate in regulating airflow between the interior cavity 208 of the wearable haptic apparatus 200 and an external environment.

Although shown in FIGS. 2A-B as being implemented in a wearable haptic apparatus 200, the haptic feedback components 220a-e can be incorporated onto buttons of a surface of a keyboard, a trackpad of a computing device, or other electronic device or consumer device.

FIG. 3 illustrates a block diagram of an electronic haptic device 300, in accordance with some embodiments. FIG. 3 illustrates that the electronic haptic device 300 includes a haptic feedback component 350 that can be configured to generate haptic feedback. In some examples, the electronic haptic device 300 refers to the wearable haptic apparatus 200 of FIGS. 2A-B. As shown in FIG. 3, the electronic haptic device 300 includes a controller 310 that is configured for controlling the overall operation of the electronic haptic device 300. The controller 310 can be configured to receive an electrical signal from a sensor 360 that corresponds to one or more motion parameters that are detected by the sensor 360.

In some examples, the motion parameter can refer to at least one of distance ($D_1$) of the user's appendage, acceleration ($A_1$) of the user's appendage, velocity ($V_1$) of the user's appendage, force ($F_1$) of the user's appendage, an angle ($\theta_1$) of the user's appendage, change in position ($\Delta_{1-2}$) of the user's appendage, and rotation (e.g., 6-DOF) of the user's appendage. In some embodiments, the sensor 360 can be a capacitive sensor, an accelerometer, an optical sensor, a magnetic potentiometer, a gyroscope, a strain gage, a camera, or an optical imaging system. In some examples, the electronic haptic device 300 may not include a sensor 360. In such an instance, the electronic haptic device 300 can rely upon a wireless antenna 380 to receive the one or more motion parameters from an external sensor.

The controller 310 can be configured to generate one or more haptic feedback parameters based on the one or more motion parameters that are detected. The haptic feedback parameter can be transmitted from the controller 310 to a power supply 330. In some examples, the power supply 330 is optionally included with the electronic haptic device 300. In other examples, the power supply 330 is external to the electronic haptic device 300. The haptic feedback parameter can refer to an electrical control signal that indicates at least one of an amount of voltage, amplitude, pulse width, duty cycle, and the like. In conjunction with receiving the haptic feedback parameter, the power supply 330 can generate an input voltage to one or more electrodes 370 that are included with the electronic haptic device 300. The one or more electrodes 370 are configured to provide an input voltage to the haptic feedback component 350 to cause a haptic feedback element 352 (e.g., piezoelectric element, electroactive substrate, magnetic assembly, voice coil, linear resonance actuator etc.) to be actuated from an initial configuration (i.e., non-actuated) to a modified configuration so as to cause the haptic feedback component 350 to generate haptic feedback. In some examples, the haptic feedback element 352 can be actuated by the one or more electrodes 370 to adjust an amount of strain, compression, or force that is applied to the user's appendage and, thus detected by the user.

In some examples, the controller 310 is able to generate feedback by the haptic feedback component 350, in response to the sensor 360 detecting that contact has been made, in less than about 500 milliseconds. In some examples, feedback time from detecting contact by the sensor 360 to generating feedback by the haptic feedback component 350 is between about 1 millisecond to about 100 milliseconds. In some examples, the feedback time can refer to a range of milliseconds or microseconds.

In some embodiments, the electronic haptic device 300 includes a wireless antenna 380 that can be configured to receive one or more haptic feedback preferences e.g., from the electronic device 150. In some examples, the feedback preference is selected via the media application of the electronic device 150. The controller 310 can be configured to receive the haptic feedback preference from the electronic device 150 and subsequently combine the haptic feedback preference with the one or more motion parameters to generate one or more modified haptic feedback parameters. In this manner, the electronic haptic device 300 can be configured to cause the haptic feedback component 350 to generate haptic feedback that is not entirely based on the one or more motion parameters. The electronic haptic device 300 can also include a network/bus interface 302 that couples the wireless antenna 380 to the controller 310. The controller 310 can be electrically coupled to the power supply 330 via a bus 311.

In some embodiments, the electronic haptic device 300 includes a memory 320 that can be configured to store the one or more motion parameters and/or the one or more haptic feedback preferences.

In some embodiments, the haptic feedback element 352 can be comprised of one or more of an electroactive substrate, a magnetic assembly, a voice coil, a linear resonance actuator, or a piezoelectric element.

In some embodiments, where the haptic feedback element 352 of the haptic feedback component 350 is an electroactive substrate, the haptic feedback element 352 can be configured to sense the one or more motion parameters as well as generate haptic feedback based on the one or more motion parameters. The electroactive substrate can be configured to detect an amount of mechanical strain or force that is applied against the haptic feedback element 352 by the user's appendage. Based upon the amount of mechanical strain or force that is applied against the electroactive substrate, the electroactive substrate can in turn be activated to expand and/or contract to induce strain on the haptic feedback component 350. In some examples, where the haptic feedback component 350 is included within an enclosure 210 of a wearable haptic apparatus 200, the haptic feedback component 350 can also expand/contrast relative to the enclosure 210 that can be perceived by the user. In some embodiments, the electrodes 370 can be configured to generate an electrostatic force that causes the electroactive substrate to expand or contract. In some examples, the electroactive substrate can be comprised of silicone, acrylates, and/or polyurethane materials.

In some embodiments, where the haptic feedback element 352 is comprised of an electroactive substrate, the haptic feedback element 352 can be configured to detect an amount of force or load that is exerted against a surface of the haptic feedback element 352. For example, the electroactive substrate can be positioned adjacent to a capacitive sensor which can detect deformations in the electroactive substrate. In turn, the capacitive sensor can provide an electrical signal to the controller 310 that is indicative of the deformation. In turn, the controller 310 can actuate the electroactive substrate to expand and or contract to provide haptic feedback. In this manner, the haptic feedback component 350 does not require an external sensor or communication with the electronic device 150 in order to generate haptic feedback.

In some embodiments, where the haptic feedback element 352 is a magnetic assembly, the magnetic assembly can include a magnetic coil element and a permanent magnetic element that is coupled to a mass. As current, from the power supply 330, is driven through the magnetic coil element, a magnetic field can be generated by the magnetic coil element. The magnetic field can cause the mass that is coupled to the permanent magnetic element to displace. Displacement of the mass can produce vibrations that can be perceived by the user.

In some embodiments, the haptic feedback element 352 can refer to a linear resonance actuator. In some embodiments, the linear resonance actuator can include a magnetic element, a spring element, a voice coil, and a mass that is coupled to the spring element. The spring element can be configured to maintain the mass under a small amount of tension. The mass can be coupled to the magnetic element, where the magnetic element is situated within the voice coil. The voice coil remains stationary while an electrical current is driven through the voice coil in order to generate a magnetic field. In turn, the magnetic field causes the mass to displace relative to the voice coil. Displacement of the mass can cause the linear resonance actuator structure to displace and produce a vibration that can be perceived by the user.

In some embodiments, where the haptic feedback element 352 refers to a linear resonance actuator, the haptic feedback element 352 can be configured to generate a plurality of different frequencies that correspond to the changes in capacitance that are detected by the sensor 360. In some embodiments, the magnetic field that is generated by the magnetic coil element can affect at least one of a position, velocity, acceleration, momentum, or frequency of the displacement of the mass. In some embodiments, the power supply 330 can be configured to adjust the amount or type of electrical current (e.g., polarity, strength, amplitude, frequency) that can affect the magnetic field generated by the magnetic coil element.

In some embodiments, the haptic feedback element 352 refers to one or more piezoelectric discs. The piezoelectric discs can be arranged in a stacked configuration, where each piezoelectric disc is characterized as having a range in size, e.g., between about 0.5 millimeters to about 1 millimeters. By stacking the piezoelectric discs in a stacked configuration, the displacement of a mass that is coupled to the piezoelectric discs can be amplified. In this manner, the stack requires less input voltage in order to generate an electric field. In some examples, each piezoelectric disc can be configured to displace between e.g., a minimum range of about 10 micrometers to a maximum range of about 1 millimeter. In some examples, the piezoelectric discs can be coupled to a force concentrator that is configured to concentrate the amount of force generated by displacement of the piezoelectric discs towards the mass. In some embodiments, the piezoelectric discs are configured to contract in an axial or linear direction (e.g., up/down) based upon a polarity of the input voltage. For example, a positive voltage that is applied to the piezoelectric disc causes the piezoelectric disc to displace in a first direction (e.g., up), while a negative voltage that is applied to the piezoelectric discs can cause the piezoelectric discs to displace in a second direction (e.g., down) that is opposite the first direction. Displacement of the piezoelectric discs can cause the piezoelectric discs to push against a spring that is coupled to a mass that results in an increased amount of displacement of the mass. Displacement of the piezoelectric discs in a specified direction can cause the spring to oscillate in a corresponding direction. In some examples, the piezoelectric discs or elements can be referred to as unimorph actuators or bimorph actuators.

In some embodiments, the power supply 330 can apply a single electrical pulse to the electrodes 370 to simulate a click. In some embodiments, the power supply 330 can apply continuous and repeating electrical pulses (e.g., AC, DC) to cause the electrodes 370 to pulse in a manner to simulate creating textures.

Figure 4:
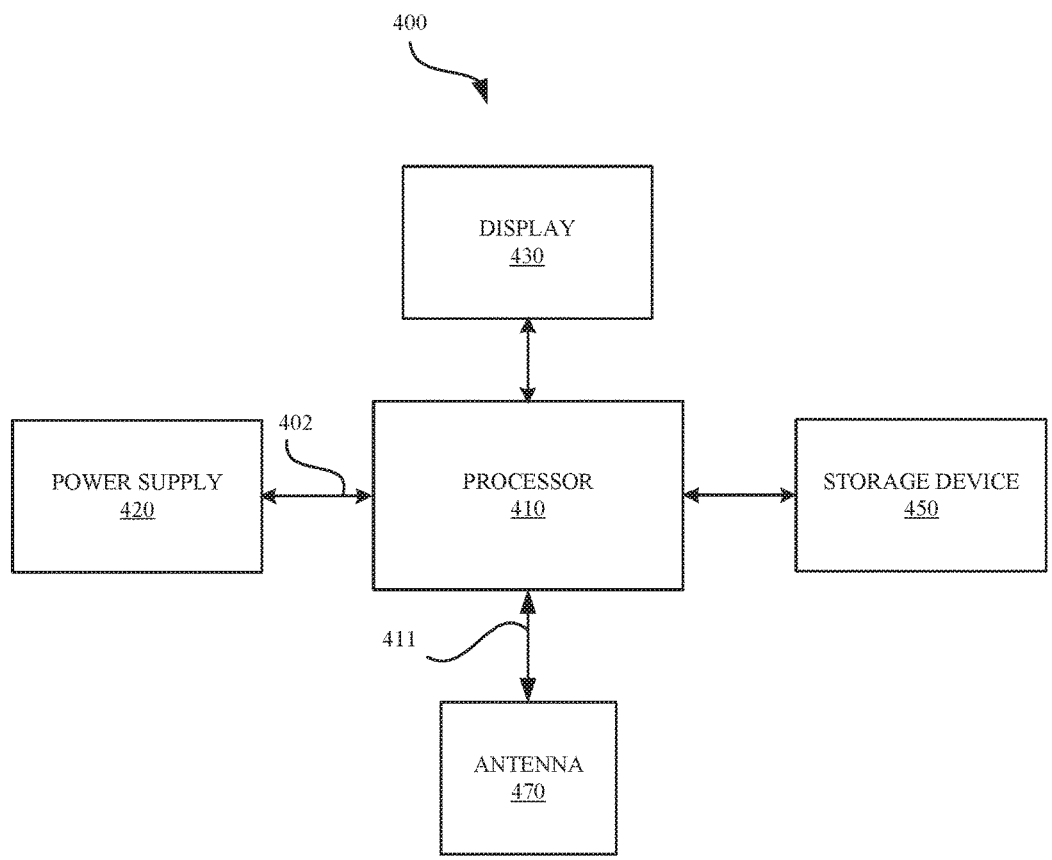
FIG. 4 illustrates a computing device for interacting with the electronic haptic device, in accordance with some embodiments.

FIG. 4 illustrates a block diagram of an electronic device 400 that can be used to implement the various components described herein, according to some embodiments. In particular, the detailed view illustrates various components that can be included in the electronic device 150 illustrated in FIG. 1. As shown in FIG. 4, the electronic device 400 can include a processor 410 for controlling the overall operation of the electronic device 400. The electronic device 400 includes a display 430. The display 430 can take a variety of forms, including a touch screen panel. The display 430 can be controlled by the processor 410 to display information or visual stimuli to the user. The electronic device 400 can also include a network/bus interface 411 that couples a wireless antenna 470 to the processor 410.

The electronic device 400 also includes a storage device 450, which can comprise a single disk or multiple disks (e.g., hard drives), and includes a storage management module that manages one or more partitions within the storage device 450. A data bus 402 can facilitate data transfer between at least a storage device 450 and the processor 410. In some embodiments, the storage device 450 can include flash memory, semiconductor (solid state) memory or the like. The electronic device 400 can also include a Random Access Memory (RAM) and a Read-Only Memory (ROM). The ROM can store programs, utilities or processes to be executed in a non-volatile manner. The RAM can provide volatile data storage, and stores instructions related to the operation of the electronic device 400.

FIGS. 5A-5D illustrate various views of a haptic feedback component 500 in accordance with some embodiments. In some examples, the haptic feedback component 500 can be characterized as having a cantilever mechanism. FIG. 5A illustrates a top view of the haptic feedback component 500. The haptic feedback component 500 includes a frame 510 having a flexible beam member 530 that is coupled to an edge surface 506 of the haptic feedback component 500. A portion of the flexible beam member 530 can be isolated from the frame 510 via a cavity 508. In this manner, the flexible beam member 530 is configured to flex relative to the frame 510 in a substantially curvilinear manner, while using the edge surface 506 as a pivot for the bending of the flexible beam member 530. In some examples, the flexible beam member 530 is contoured to have a shape and size that is configured to receive the user's appendage. In some examples, the shape of the flexible beam member 530 can be generally planar, rounded, indented, or protruded. In some embodiments, the flexible beam member 530 can be configured to amplify the displacement of the haptic feedback element 520 when the haptic feedback element 520 is actuated. In some embodiments, the frame 510 can define a displacement range ($D_r$) that dictates the maximum range by which the flexible beam member 530 can flex relative to the frame 510 via the pivot at the edge surface 506, as shown in FIGS. 5C-5D. In some examples, the displacement range ($D_r$) is about e.g., 30 micrometers.

In some embodiments, the haptic feedback component 500 includes a haptic feedback element 520 that is coupled to the flexible beam member 530. For example, the haptic feedback element 520 can be coupled to a lower surface or an upper surface of the flexible beam member 530. The electrodes 370 can deliver an input voltage to the haptic feedback element 520 to cause the haptic feedback element 520 to actuate. In turn, actuation of the haptic feedback element 520 can cause the flexible beam member 530 to displace, as shown in FIGS. 5C-5D.

In some examples, the frame 510 of the haptic feedback component has a thickness between about e.g., 0.35 mm-0.5 mm. In some examples, the frame 510 and the flexible beam member 530 can be machined from a single slab of metal or metal alloy.

As shown in FIG. 5B, in some examples, the haptic feedback element 520 can be coupled or laminated to the flexible beam member 530. When the haptic feedback element 520 is actuated, the haptic feedback element 520 can contract so as to cause the flexible beam member 530 to displace in a number of different directions, as described in more detail with reference to FIGS. 5C-5D.

FIGS. 5C-5D illustrate side views of the haptic feedback component 500, in accordance with some embodiments. As shown in FIG. 5C, the electrodes 370 can deliver a negative voltage to the haptic feedback element 520, which actuates (e.g., contracts) the haptic feedback element 520 such that the flexible beam member 530 displaces in a substantially upwards manner from the frame 510. The deflection of the flexible beam member 530 can be perceived by the user's appendage (U).

Contrarily, as shown in FIG. 5D, the electrodes 370 can deliver a positive voltage to the haptic feedback element 520, which causes the haptic feedback element 520 actuate in a substantially axial direction, thus causing the flexible beam member 530 to displace in a substantially downwards manner from the frame 510. The deflection of the flexible beam member 530 can be perceived by the user's appendage (U).

As a result, FIGS. 5C-5D show that depending upon the polarity of the input voltage that is provided to the haptic feedback element 520, the user can perceive varying degrees of haptic feedback. Moreover, in some embodiments, the actuation of the haptic feedback element 520 can be correlated with the strength (e.g., amplitude) of the input voltage that is provided by the power supply 330. Since the frame 510 can establish a fixed displacement range or boundary for the flexible beam member 530, the displacement of the flexible beam member 530 can also induce an amount of stiffness, compression, or mechanical strain on the frame 510 that can be perceived by the user's appendage (U).

In some examples, actuation of the haptic feedback element 520 causes the haptic feedback element 520 to contract which induces strain on the flexible beam member 530 that can be perceived by the user's appendage (U). In some examples, the more areas of the user's appendage (U) that are in contract with the flexible beam member 530 (i.e., larger contact surface area) can increase the shearing effect that is generated. Contrarily, the smaller the surface area of the flexible beam member 530 that is in contact with the user's appendage (U), the smaller the shearing effect that is generated. Shearing effect can also refer to shearing strain, which refers to deformation of a material of the flexible beam member 530 as it slides parallel to the user's appendage (U).

In some examples, by displacing the flexible beam member 530 towards the user's appendage (as shown in FIG. 5C), the haptic feedback component 500 can cause a greater surface area of the flexible beam member 530 to come into contact with the user's appendage (U). In some examples, actuation of the flexible beam member 530 can cause the flexible beam member 530 to conform around the shape and size of the user's appendage (U). As a result, by increasing the contact area, the user can perceive a greater amount of compliance. In some examples, a greater amount of compliance can correspond to the perception of touching a soft, plush material. In contrast, displacing the flexible beam member 530 away from the user's appendage (as shown in FIG. 5D), the haptic feedback component 500 can cause less of the flexible beam member 530 to contact the user's appendage. By decreasing the surface area contact, the user can perceive a greater amount of stiffness. In some examples, a greater amount of stiffness can correspond to touching a hard, immobile object. In this manner, displacing the flexible beam member 530 towards or away from the user's appendage (U) can cause varied perceptions of stiffness or pliability.

In some examples, the haptic feedback component 500 can be made of material that can be configured to deform, expand, or contract as measured by Young's modulus. In some examples, the materials that form the frame 510 and the flexible beam member 530 can be made from a variety of metal and metal alloys. In some examples, the metals utilized can include steel, steel wire, aluminum, titanium, or glass.

In some examples, where the haptic feedback component 500 includes a haptic feedback element 520 (e.g., piezoelectric element, electroactive substrate, linear resonance actuator, magnetic element, voice coil), the haptic feedback component can be configured to generate a blocking force of e.g., 10 N, and a limited displacement of e.g., 1 micrometer. In contrast, laminating the flexible beam member 530 to the haptic feedback element 520 can generate a blocking force of e.g., 1 N, and a displacement of e.g., 30 micrometers. Thus, where the haptic feedback component 500 simply comprises a haptic feedback element 520 (i.e., no blocking element such as a frame 510 or flexible beam member 530), then the haptic feedback component 500 does not generate as much displacement as a haptic feedback component 500 that includes a flexible beam member 530.

In some embodiments, the haptic feedback component 500 can be characterized as being ungrounded. In other words, no load path is provided to a rigid mount of the frame 510 that provides feedback force.

Additionally, the flexible beam member 530 can start out in an upwards configuration (i.e., the flexible beam member 530 extends above the frame 510) in conjunction with a non-actuated configuration, and when the haptic feedback element 520 is actuated, the flexible beam member 530 can be configured to displace in a substantially downwards direction. Alternatively, the flexible beam member 530 can start out in a downwards configuration (i.e., the flexible beam member 530 extends below the frame 510) in conjunction with the non-actuated configuration, and be configured to displace in a substantially upwards direction when the haptic feedback element 520 is actuated.

FIGS. 6A-6C illustrate various views of a haptic feedback component 600 and timing diagram associated with a haptic feedback component 600 being actuated from an initial configuration to a modified configuration, in accordance with some embodiments. FIG. 6A illustrates a haptic feedback component 600 in an initial configuration, while FIG. 6B illustrates the haptic feedback component 600 in a modified configuration. In conjunction with actuating the haptic feedback component 600 to the modified configuration, the controller 310 can be configured to cause electrodes 370 to transmit a single electrical pulse to the haptic feedback element 620 (as shown in FIG. 6C). Firing a single electrical pulse can cause the haptic feedback element 620 to displace the flexible beam member 630 in a single instance. In some examples, a sensor 360 can be configured to detect the motion parameter of the user's appendage (U) pushing down on the haptic feedback component 600, in the air (in contrast to on a hard surface). In other words, the sensor 360 can detect the mechanical strain exerted by the user's appendage (U) against the surface of the flexible beam member 630. Thereafter, the controller 310 can cause the flexible beam member 630 to react by actuating the haptic feedback element 620. FIG. 6C shows that a large amount of voltage to be pulsed in a short period of time so that the user perceives a large click instead of a more drawn-out vibration of repeating pulses that have lower magnitude. In some examples, the waveform generated to simulate an air click can be characterized as having a Gaussian wave instead of a sinusoidal wave.

In some embodiments, the shape of the waveform can be adjusted by a waveform generator or a pulse width modulation unit of the wearable haptic apparatus 200. By adjusting the shape of the waveform, the haptic feedback component 600 can be configured to generate different types of haptic feedback.

FIGS. 7A-7E illustrate various views of a haptic feedback component 700 in accordance with some embodiments. FIG. 7A illustrates a top view of the haptic feedback component 700. The haptic feedback component 700 includes a frame 710 and a flexible beam member 730 that is coupled a first portion 702 and a second portion 704 of the frame 710. In some examples, the haptic feedback component 700 can be characterized as having a dual fixed beam; otherwise, referred to as a flexible beam member 730 that is coupled to both ends of the frame 710. A portion of the flexible beam member 730 can be isolated from the frame 710 via cavities 708. In this manner, the flexible beam member 730 is configured to flex relative to the frame 710 in a substantially curvilinear manner. In some examples, the flexible beam member 730 is contoured to have a shape and size that is configured to receive the user's appendage. In some embodiments, the flexible beam member 730 can be configured to amplify the displacement effects of the haptic feedback element 720 when the haptic feedback element 720 is actuated. In some embodiments, the frame 710 can define a displacement range ($D_r$) that dictates the maximum range by which the flexible beam member 730 can flex relative to the frame 710 as shown in FIGS. 7D-7E. In some examples, the displacement range ($D_r$) is about e.g., 30 micrometers.

In some embodiments, the haptic feedback component 700 includes a haptic feedback element 720 that is positioned on a lower surface or an upper surface of the flexible beam member 730. The electrodes 370 can deliver an input voltage to the haptic feedback element 720.

FIG. 7B illustrates a side view of the haptic feedback component 700. In some examples, the haptic feedback element 720 can be coupled or laminated to the flexible beam member 730. When the haptic feedback element 720 is actuated, the haptic feedback element 720 can contract/expand so as to cause the flexible beam member 730 to displace, as described in more detail with reference to FIGS. 7C-7E.

FIGS. 7C-7E illustrate perspective views of the haptic feedback component 700 in non-actuated and actuated configurations, in accordance with some embodiments. FIG. 7C shows the haptic feedback component 700 in a non-actuated configuration. As shown in FIG. 7C, the flexible beam member 730 can be characterized as being substantially planar relative to the frame 710. The non-actuated configuration can refer to where the haptic feedback element 720 is not currently receiving an input voltage from the electrodes 370.

FIGS. 7D-7E show the haptic feedback component 700 in an actuated configuration. As shown in FIG. 7D, the electrodes 370 can deliver a negative voltage to the haptic feedback element 720, which causes the haptic feedback element 720 to actuate in a substantially axial direction (e.g., contract or expand), so that the haptic feedback element 720 causes the flexible beam member 730 to displace in a substantially upwards manner from the frame 710. The deflection of the flexible beam member 730 can be perceived by the user's appendage.

Contrarily, as shown in FIG. 7E, the electrodes 370 can deliver a positive voltage to the haptic feedback element 720, which causes the haptic feedback element 720 to actuate in a substantially axial direction (e.g., contract or expand), whereupon the haptic feedback element 720 causes the flexible beam member 730 to displace in a substantially downwards manner from the frame 710. The deflection of the flexible beam member 730 can be perceived by the user's appendage. Since the frame 710 can establish a fixed displacement range or boundary for the flexible beam member 730, the displacement of the flexible beam member 730 can also induce an amount of stiffness, compression, or mechanical strain on the frame 710 that can be perceived by the user.

In some examples, by displacing the flexible beam member 730 towards the user's appendage (as shown in FIG. 7D), the haptic feedback component 700 can cause a reduced amount of surface area of the flexible beam member 730 to be in contact with the user's appendage. By decreasing the surface area contact, the user can perceive a greater amount of stiffness. In some examples, a greater amount of stiffness can correspond to touching a hard, immovable object. Contrarily, by displacing the flexible beam member 730 away from the user's appendage (as shown in FIG. 7E), the haptic feedback component 700 can cause an increased amount of surface area of the flexible beam member 730 to be in contact with the user's appendage. As a result, by increasing the contact area, the user can perceive a greater amount of compliance. In some examples, a greater amount of compliance can correspond to touching a pliable material.

In some examples, the frame 710 of the haptic feedback component has a thickness between about e.g., 0.35 mm-0.5 mm. In some examples, the frame 710 and the flexible beam member 730 can be machined from a single slab of metal or metal alloy.

In some embodiments, the haptic feedback component 700 can be characterized as being ungrounded. In other words, no load path is provided to a rigid mount that provides feedback force.

FIGS. 8A-8D illustrate perspective views and schematic diagrams of a system 800 for using a plurality of haptic feedback components 810*a-e* to generate haptic feedback. As shown in FIG. 8A, each haptic feedback components 810*a-e* can be coupled to the user's appendage, such as in the form of the wearable haptic apparatus 110. FIG. 8A illustrates the haptic feedback components 810*a-e* during a time 1 (T1) where the user's hand and appendages are in a static (i.e., non-moving) state. In this manner, because the sensors 360 do not detect a motion parameter, the controller 310 does not generate a haptic feedback parameter to cause haptic feedback to be generated by the haptic feedback components 810*a-e*. However, it should be noted that even where the sensors 360 do not detect a motion parameter, if the haptic feedback components 810*a-e* are comprised of an electroactive substrate, the electroactive substrate can still detect an amount of mechanical strain or load that is exerted by the user's appendage against the haptic feedback components 810*a-e*. For example, the user's appendage can exert subtle vibrations against the surface of the haptic feedback components 810*a-e* that may be too small to be detected by sensors 360. Accordingly, use of the electroactive substrate can still cause some slight amount of haptic feedback to be generated, even where the wearable haptic apparatus 110 is in a static state.

FIG. 8B illustrates the haptic feedback components 810*a-e* during a time 2 (T2) where the user's hand and appendages are in a moving state, such as during a swiping or gesture motion. In some embodiments, one or more sensors 360 can be configured to detect the motion, whereupon the one or more sensors 360 can generate a motion parameter that is transmitted to the controller 310. For example, FIG. 8B illustrates that the haptic feedback components 810*b*, 810*c*, 810*d* have been moved relative to the haptic feedback components 810*a*, 810*e*, such that at least one motion parameter, including distance, acceleration, velocity, force, angle, change in position, and rotation have been affected as a result of the moving state of the user's appendages.

In some embodiments, the controller 310 can be configured to cause the haptic feedback components 810*a-e* to generate haptic feedback that corresponds to the one or more motion parameters detected. In some examples, the controller 310 can receive one or more haptic feedback preferences that are executed by a media application of the electronic device 150. Accordingly, the controller 310 can be configured to generate different types of haptic feedback in accordance with the combination of the one or more detected motion parameters and the one or more haptic feedback preferences.

FIG. 8C illustrates a timing diagram for generating haptic feedback that simulates a perception of textures. In some embodiments, the controller 310 can cause the one or more electrodes 370 to provide electrical pulses to each of the haptic feedback components 810*a-e* in a sequential manner. As shown in FIG. 8C, the waveform generated by the electrical pulses is a generally repeating waveform. In some examples, sequentially firing each of the haptic feedback components 810*a-e* can generate a perception that an object is running through the user's appendages. For example, in context of the system 100 of FIG. 1, where the display 152 of the electronic device 150 displays the waves, the electronic device 150 can transmit instructions to the wearable haptic apparatus 110 that causes a user to perceive that the waves are pouring water through the user's appendages as each of the haptic feedback components 810a-e are being sequentially actuated to generate haptic feedback.

FIG. 8D illustrates a timing diagram for generating haptic feedback to simulate a user perception of textures. For instance, FIG. 8D shows a waveform having a larger amplitude, and a shorter frequency relative to the waveform shown in FIG. 8C. In some examples, the waveform can be referred to as a non-repeating waveform. In some embodiments, the controller 310 can be configured to cause the one or more electrodes 370 to provide electrical pulses to the haptic feedback components 810a-e in a concurrent manner so that a haptic feedback element of each of the haptic feedback components 810a-e generates haptic feedback simultaneously. Concurrently stimulating several haptic feedback components 810a-e can cause a large amount of voltage to be pulsed in a short period of time so that the user perceives a large amount of surface area of a flexible beam member (not illustrated) of the haptic feedback components 810a-e that are in contact with his appendage. Additionally, generating a large surface area can simulate the perception that the user is in contact with a soft, compliant surface (e.g., foam, water). Accordingly, in the context of the system 100 of FIG. 1, where the display 152 of the electronic device 150 displays the ocean, the electronic device 150 can transmit instructions to the wearable haptic apparatus 110 to cause the user to perceive that his appendages are touching water as two or more of the haptic feedback components 810a-e are concurrently actuated to generate a larger amount of surface area contact.

Additionally, each of the haptic feedback components 810a-e can be individually actuated, so as to cause the user to perceive a smaller surface area of contact. By actuating fewer haptic feedback components 810a-e can generate a smaller surface area of contact with the user's appendages, and thus create a perception that the user is touching a hard, rigid surface. For example, in the context of the system 100 of FIG. 1, where the display 152 of the electronic device 150 displays the palm trees, the electronic device 150 can transmit instructions to the wearable haptic apparatus 110 to cause the user to perceive that his appendages are touching a palm tree as only one of the haptic feedback components 810a-e are actuated to generate a larger amount of surface area contact.

Additionally, each of the haptic feedback components 810a-e can be individually and sequentially actuated according to a pre-determined order, regular order, or random pattern.

FIGS. 9A-9G illustrate various embodiments of a haptic feedback component 900, in accordance with some embodiments. FIG. 9A illustrates a top view of a haptic feedback component 900, in accordance with some embodiments. The haptic feedback component 900 includes a frame 910 having a flexible beam member 930 that is coupled to a first portion 902 and a second portion 904 of the frame 910. A portion of the flexible beam member 930 can be isolated from the frame 910 via cavities 908a-b. In this manner, the construction of the haptic feedback component 900 of FIG. 9A allows for the flexible beam member 930 to flex relative to the frame 910 in a substantially curvilinear manner.

FIG. 9B illustrates a top view of a generally elliptical-shaped haptic feedback component 900 in accordance with some embodiments. In this manner, the haptic feedback component 900 can be characterized as having a shape and size that conforms more to the user's appendage (U) relative to the haptic feedback component 900 shown in FIG. 9A.

FIG. 9C illustrates a top view of a diamond-shaped haptic feedback component 900 in accordance with some embodiments.

FIG. 9D illustrates a top view of a haptic feedback component 900 that includes a flexible beam member 930 that has a shape and size that corresponds to the user's appendage (U). For example, the flexible beam member 930 includes a major dimension and a minor dimension having different dimensions that are sized to correspond to the user's appendage.

FIGS. 9E-9F illustrate a top view and a cross-sectional view of a haptic feedback component 900, respectively, in accordance with some embodiments. The haptic feedback component 900 includes a plurality of cavities 908a-b, where a central cavity 908a is included along the medial axis of the frame 910, while peripheral cavities 908b are included along the peripheries of the frame 910. In this manner, the user's appendage (U) can fit within the central cavity 908a. In some examples, the central cavity 908a is characterized as having a stepped profile or gradient surface so that the surface area of the opening of the central cavity 908a is progressively smaller than a lower surface of the haptic feedback component 900, as shown in FIG. 9F. In this manner, the individual folds or ridges of skin of the user's appendage (U) can individually experience different amount of specific haptic feedback when the haptic feedback element 920 is actuated. Additionally, due to the presence of the central cavity 908a, the haptic feedback component 900 of FIGS. 9E-9F has multiple haptic feedback elements 920 that are positioned along the peripheral edges of the haptic feedback component 900 in order to accommodate for the user's appendage.

FIG. 9G illustrates a top view of a round-shaped haptic feedback component 900 in accordance with some embodiments. In this type of arrangement, the haptic feedback component 900 includes a round (e.g., circular) flexible frame 910 and a round (e.g., circular) haptic feedback element 920. Flexible frame 910 may be a continuous layer that is free of holes and cavities, or flexible frame 910 may have cut-outs to adjust the stiffness of frame 910 (e.g., holes similar to cavities 908 of FIG. 9A-9F). Flexible frame 910 may have a first diameter and haptic feedback element 920 may have a second diameter that is smaller than the first diameter, if desired. Haptic feedback element 920 may be a piezoelectric element mounted to flexible frame 910. This type of arrangement results in a circular warpage of frame 910 with the greatest amount of deflection in the center region of frame 910. Frame 910 may be relatively small in diameter (e.g., 2-3 mm, 1-5 mm, 5-10 mm, less than 5 mm, greater than 5 mm, etc.), or frame 910 may be relatively large in diameter (e.g., about the size of a user's palm or hand). Haptic feedback component 900 may have other suitable shapes and sizes, if desired. The arrangement of FIG. 9G is merely illustrative.

FIGS. 10A-10D illustrate various views of several embodiments of a haptic feedback component 1000. FIG. 10A illustrates a haptic feedback component 1000 that includes a frame 1010 having a plurality of flexible beam member 1030a-b. Each flexible beam member 1030a-b includes a respective haptic feedback element 1020a or 1020b that is coupled to a lower surface of the flexible beam member 1030, while the upper surface of each of the flexible beam members 1030a-b has a shape and size to receive a user's appendage (U). In some embodiments, the haptic feedback elements 1020a-b can be individually actuated by the one or more electrodes 370. Actuation of the haptic feedback elements 1020a-b can cause the flexible beam members 1030a-b to displace in a substantially curvilinear manner. As shown in FIG. 10A, the plurality of flexible beam members 1030a-b are arranged along a longitudinal axis of the haptic feedback component 1000.

In some embodiments, the haptic feedback elements 1020a-b can receive electrical pulses from the one or more electrodes 370 to be actuated in a sequential manner. Sequentially firing each of the haptic feedback components 810a-e can generate a perception that an object is running through the user's appendage (U). Additionally, the haptic feedback elements 1020a-b can be actuated concurrently.

FIG. 10B illustrates a cross-sectional view of the haptic feedback component 1000 of FIG. 10A in conjunction with an actuated configuration. As shown in FIG. 10B, the flexible beam members 1030a-b can be actuated to extend upwards relative to the frame 1010 so as to create the perception that the user's appendage (U) is in contact with a larger surface.

FIG. 10C illustrates a haptic feedback component 1000 that includes a frame 1010 and a plurality of flexible beam member 1030a-f coupled to the frame 1010. Each flexible beam member 1030a-f includes a respective haptic feedback elements 1020a-f that is coupled to a lower surface of the flexible beam member 1030a-f, while the upper surface of the flexible beam member 1030a-f has a shape and size to receive a user's appendage (U). In some embodiments, the haptic feedback elements 1020a-f can be individually or concurrently actuated by the one or more electrodes 370. Actuation of the haptic feedback elements 1020a-f can cause the flexible beam members 1030a-f to displace in a substantially curvilinear manner. As shown in FIG. 10C, the plurality of flexible beam members 1030a-b are arranged along a lateral axis of the haptic feedback component 1000.

FIG. 10D illustrates a cross-sectional view of the haptic feedback component 1000 of FIG. 10C in conjunction with an actuated configuration. In some embodiments, the haptic feedback elements 1020a-f can be concurrently actuated so as to generate haptic feedback. By concurrently actuating, the haptic feedback elements 1020a-b can create a perception that the user's appendage is in contact with a large contact surface as more areas of the user's appendage (U) are being concurrently stimulated, as shown in FIG. 10D. Accordingly, FIGS. 10A-10D illustrate components for generating localized haptic feedback. In some embodiments, the haptic feedback elements 1020a-f can receive electrical pulses from the one or more electrodes 370 to be actuated in a sequential manner. Sequentially firing each of the haptic feedback elements 1020a-f can generate a perception that an object is running through the user's appendage (U).

Figure 11A:
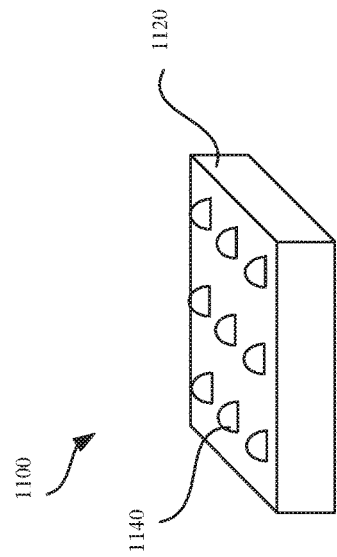
FIGS. 11A-11D illustrate various views of several embodiments of a haptic feedback component.

FIGS. 11A-11D illustrate various views of several embodiments of a haptic feedback component 1100 to generate haptic feedback. FIG. 11A illustrates a perspective view of a haptic feedback component 1100 that comprises an electroactive substrate 1120a-c. The haptic feedback component 1100 can include a single layer of an electroactive substrate 1120 or multiple layers of electroactive substrates 1120a-c that are coupled to each other. In contrast to utilizing a piezoelectric element, the electroactive substrate does not utilize a frame (e.g., 510) or flexible beam member (e.g., 530) to cause haptic feedback. Instead the electroactive substrate 1120 can be directly coupled or attached to the user's appendage. When an input voltage from the one or more electrodes 370 are provided to the electroactive substrate 1120, the electroactive substrate 1120 can be configured to actuate to either expand or contract, which can be perceived by the user's appendage. In this manner, the electroactive substrate 1120 can be configured to induce moment of in a plurality of different directions.

In some embodiments, the electroactive substrate 1120 can be positioned adjacent to (or bordered by) a plurality of electrodes 370, such as a first electrode and a second electrode. The first electrode can be configured to deliver a positive charge to the electroactive substrate 1120, while the second electrode can be configured to deliver a negative charge to the electroactive substrate 1120. In this manner, the first and second electrodes can induce an electrostatic force to be generated that causes the electroactive substrate 1120 to expand or contract. In some examples, the expansion or contraction of the electroactive substrate 1120 is dependent upon the polarity of the input voltage that is provided.

In some embodiments, where the haptic feedback component 1100 is comprised of layers of several electroactive substrates 1120a-c, each of the electroactive substrates 1120a-1120c can be configured to move independently of each other.

Figure 11B:
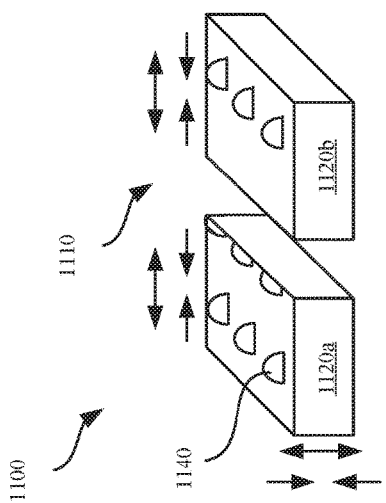
Figure 11C:
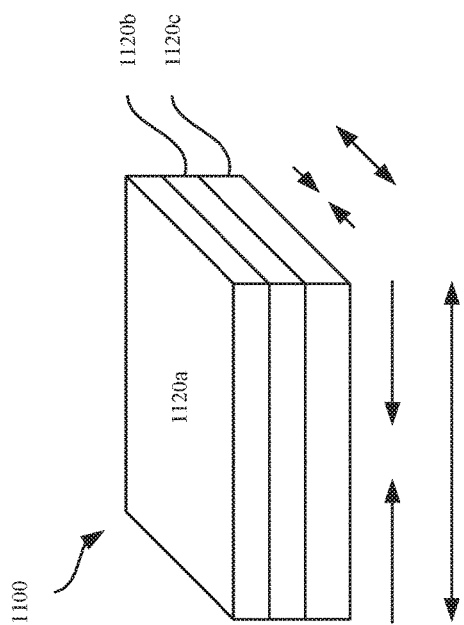
Figure 11D:
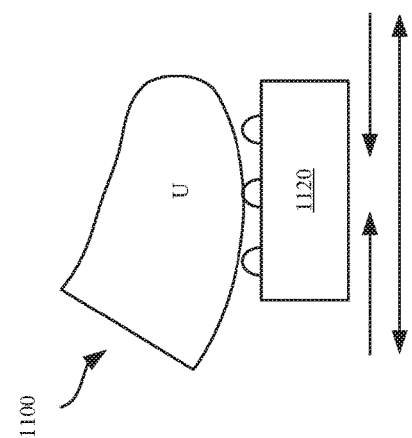

FIGS. 11B-11D illustrate various views of a haptic feedback component 1100 that includes an electroactive substrate 1120. FIGS. 11B-11C illustrate a perspective view and a side view of the haptic feedback component 1100 that includes the electroactive substrate 1120, respectively, in accordance with some embodiments. Additionally, FIGS. 11B-11C show that an upper surface of the electroactive substrate 1120 includes one or more feedback elements 1140. The feedback elements 1140 can protrude from a surface of the electroactive substrate 1120. In some examples, each feedback element 1140 extends from the upper surface of the electroactive substrate 1120. The feedback element 1140 can include a rounded surface. As the electroactive substrate 1120 can have a shape and size that corresponds to the user's appendage (U), each feedback elements 1140 can provide localized haptic feedback to a specific portion of the user's appendage (U). In conjunction with the actuation of the electroactive substrate 1120 to expand or contract, the feedback elements 1140 can move or slide along in a corresponding direction with the electroactive substrate 1120 so as to generate a shearing effect against the skin of the user's appendage (U).

In some examples, the one or more feedback elements 1140 can have a size of e.g., about 30 micrometers-1000 micrometers. In some examples, the one or more feedback elements 1140 can be arranged in a uniform pattern or in a random order.

FIG. 11D illustrates a perspective view of a haptic feedback component 1100 that includes a first stack of an electroactive substrate 1120a and a second stack of an electroactive substrate 1120b, in accordance with some embodiments. FIG. 11D shows that the first and second stack of electroactive substrates 1120a-b are independent and separate from each other. FIG. 11D shows that the first stack 1120a can be configured to move independently of the second stack 1120b. In addition, a partition 1110 can reside between the first and second stacks 1120a-b. As the first and second stacks 1120a-b move relative each other, the size of the partition 1110 can further change so as to create additional haptic feedback, such as by amplifying the contact surface area that can be detected by the user's appendage.

In some embodiments, the electroactive substrate can be utilized over the piezoelectric element since the electroactive substrate is much more compliant and can more readily expand/contract than the piezoelectric element. In addition, the electroactive substrate requires significantly less input voltage than the piezoelectric element to displace by a similar amount.

Although FIGS. 11A-11D illustrate that the electroactive substrate 1120 is substantially rectangular shaped, the electroactive substrate 1120 can be incorporated in a variety of other shapes such as circular, elliptical, polygonal, asymmetric, and the like.

Figure 12:
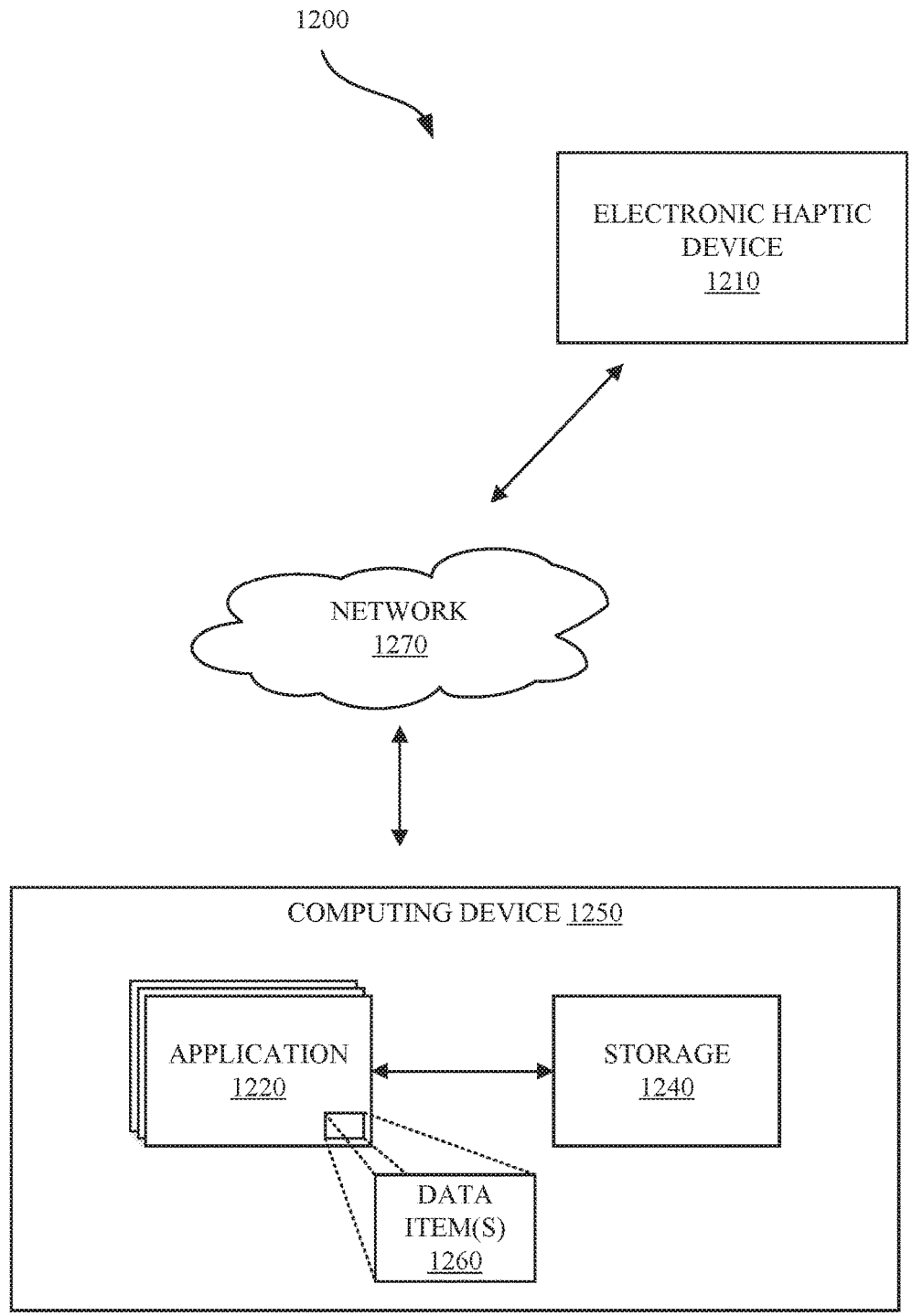
FIG. 12 illustrates a block diagram of different components of a system that is configured to implement the various techniques described herein, according to some embodiments.

FIG. 12 illustrates a block diagram of different components of a system 1200 that is configured to implement the various techniques described herein, such as generating haptic feedback, according to some embodiments. More specifically, FIG. 12 illustrates a high-level overview of the system 1200, which includes a computing device 1250 that can represent, for example, a portable computer, a tablet, a smartphone, or other electronic device. In some examples, the computing device 1250 can be the electronic device (e.g., ref. 150) that generates the visual stimuli to the user. According to some embodiments, the computing device 1250 can be configured to execute (e.g., via an operating system established on the computing device 1250) various applications 1220. In one example, the application 1220 can represent a graphic presentation program that can be configured to interact with the electronic haptic device 1210 to generate haptic feedback. In other examples, the application 1220 can represent a multimedia program. As shown in FIG. 12, the application 1220 and the storage device 1240 can be configured to directly communicate with one another. In some embodiments, the storage device 1240 can include a data item 1260 managed by the application 1220. In conjunction, the application 1220 can request the data item 1260 from the storage device 1240. In one example, the data item 1260 refers to a haptic feedback preference that can be selected by the user.

As shown in FIG. 12, the computing device 1250 is configured to communicate with the electronic haptic device 1210 via a network 1270, where the network 1270 can represent at least one of a global network (e.g., the Internet), a wide area network, a local area network, a wireless personal area network (WPAN), and the like. In some examples, the network 1270 can represent a WPAN for transmitting data between the electronic haptic device 1210 and the computing device 1250. The WPAN network can represent Bluetooth (IEEE 802.15.1), ZigBee, Wireless USB, and the like. In some examples, the network can refer to Near-Field Communication (NFC). According to some embodiments, the computing device 1250 can be configured to provide instructions to the electronic haptic device 1210 to enable a haptic feedback component of the electronic haptic device 1210 to provide haptic feedback in conjunction with one or more motion parameters that are detected.

Figure 13:
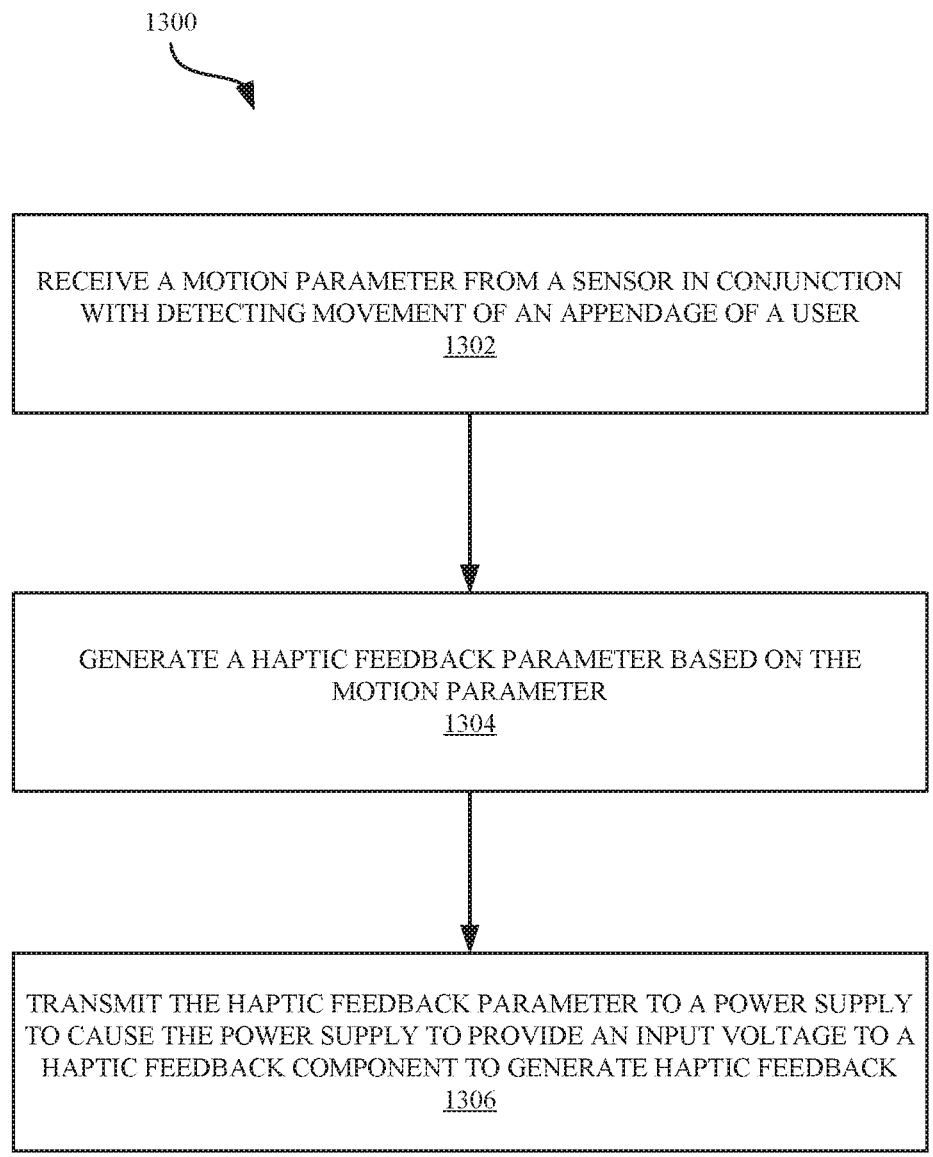
FIG. 13 illustrates a method for generating haptic feedback, in accordance with some embodiments.

FIG. 13 illustrates a method 1300 for generating haptic feedback by the electronic haptic device 300 that includes the haptic feedback component 350, in accordance with some embodiments. In some embodiments, the method 1300 begins at step 1302, where in conjunction with a sensor 360 (of the electronic haptic device 300 or external to the electronic haptic device 300) detecting movement of a user, a controller 310 of the electronic haptic device 300 can be configured to receive a motion parameter from the sensor 360.

At step 1304, the controller 310 can be configured to generate a haptic feedback parameter that is based on the motion parameter.

At step 1306, the controller 310 can be configured to transmit the haptic feedback parameter to the power supply 330 so that the power supply 330 provides an input voltage to an electrode that actuates the haptic feedback component 350 in order to generate haptic feedback.

Figure 14:
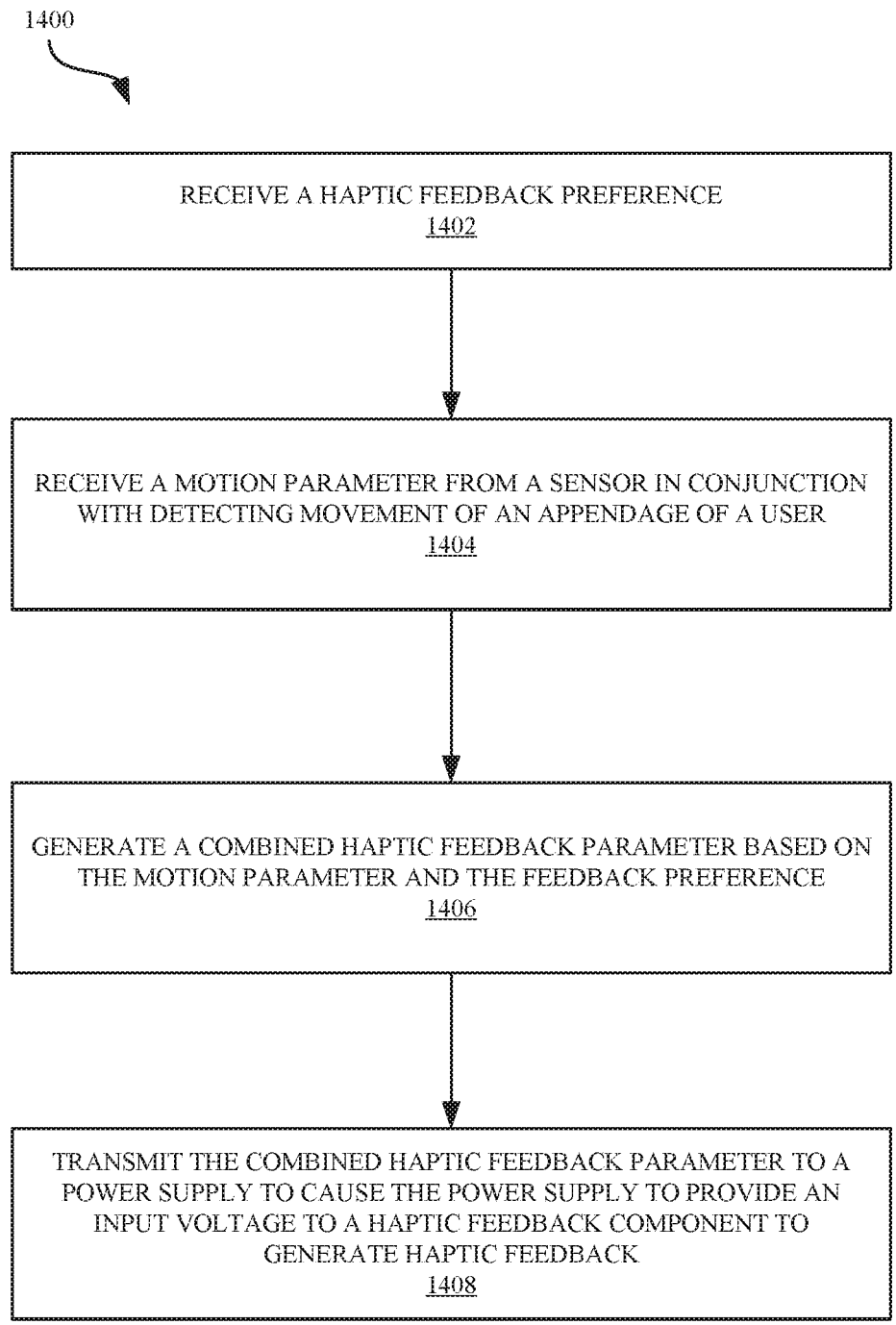
FIG. 14 illustrates a method for generating haptic feedback, in accordance with some embodiments.

FIG. 14 illustrates a method 1400 for generating haptic feedback between the electronic haptic device 300 and the electronic device 400, in accordance with some embodiments. In some embodiments, the method 1400 begins at step 1402, where the controller 310 of the electronic haptic device 300 receives a haptic feedback preference from the electronic device 400. At step 1404, the controller 310 can be configured to receive a motion parameter from a sensor 360 (of the electronic haptic device 300 or external to the electronic haptic device 300) in conjunction with the sensor 360 detecting movement of the user.

At step 1406, the controller 310 can be configured to form a modified haptic feedback parameter by combining the motion parameter with the haptic feedback preference.

At step 1408, the controller 310 can be configured to transmit the modified haptic feedback parameter to the power supply 330 so that the power supply 330 provides an input voltage to an electrode that actuates the haptic feedback component 350 in order to generate haptic feedback.

In some embodiments, the controller 310 can be configured to adjust the weight of the ratio between the motion parameter and the haptic feedback preference. For example, a user may want to place more weight on the feedback preference by assigning the feedback preference with a higher weighted value than the motion parameter. In one example, the controller 310 can select a ratio 9:1 to assign more weight to the feedback preference than to the motion parameter. In another example, the controller 310 can adjust the ratio to 5:5 to assign an equal amount of weight to the feedback preference and the motion parameter.

The various aspects, embodiments, implementations or features of the described embodiments can be used separately or in any combination. Various aspects of the described embodiments can be implemented by software, hardware or a combination of hardware and software. The described embodiments can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, hard disk drives, solid state drives, and optical data storage devices. The computer readable medium can also be distributed over network-coupled computer systems so that the computer readable code is stored and executed in a distributed fashion.

What is claimed is:

1. A haptic feedback component for generating haptic feedback, comprising:
    a frame having a size and shape for receiving an appendage of a user;
    a flexible beam member coupled to the frame, wherein the flexible beam member has opposing first and second surfaces; and
    a haptic feedback element that is coupled to the first surface of the flexible beam member, wherein the haptic feedback element actuates in response to receiving an electrical signal so as to cause the flexible beam member to displace from an initial configuration to a modified configuration, thereby applying a force to the appendage using the second surface of the flexible beam member.

2. The haptic feedback component of claim 1, wherein the size and shape of the frame defines a general displacement range of the flexible beam member.

3. The haptic feedback component of claim 1, further comprising:
an electrode that is configured to transmit the electrical signal to the haptic feedback element.

4. The haptic feedback component of claim 1, wherein the flexible beam member is coupled to a single edge of the frame, and the flexible beam member pivots via the single edge.

5. The haptic feedback component of claim 1, wherein a first end of the flexible beam member is coupled to a first portion of the frame and a second end of the flexible beam member is coupled to an opposing, second portion of the frame such that the flexible beam member is capable of displacing in a generally curvilinear manner.

6. The haptic feedback component of claim 1, wherein the displacement of the flexible beam member generates a predetermined amount of compression in the frame.

7. The haptic feedback component of claim 1, wherein the haptic feedback element comprises a piezoelectric element, an electroactive substrate, a magnetic assembly, a linear resonance actuator, or a voice coil.

8. The haptic feedback component of claim 3, wherein the haptic feedback component is electrically coupled to a controller that is configured to cause the electrode to transmit the electrical signal.

9. The haptic feedback component of claim 1, wherein the haptic feedback component includes a plurality of flexible beam members, and each flexible beam member of the plurality of flexible beam members includes a respective haptic feedback element.

10. A wearable haptic device for generating haptic feedback according to movement of an appendage of a user, the wearable haptic device comprising:
an enclosure that defines an internal cavity having a size and shape to receive the appendage;
a controller that is configured to generate a feedback parameter based on the movement of the appendage;
an electrode that is configured to generate an electrical signal based on the feedback parameter; and
a haptic feedback component carried within the internal cavity, wherein the haptic feedback component has a first portion, a second portion that extends from the first portion, and a haptic element on a first surface of the second portion, wherein haptic element is configured to actuate and move the second portion relative to the first portion from an initial configuration to a modified configuration upon receiving the electrical signal, wherein the haptic feedback component is configured to apply a force against the appendage of the user with a second surface of the second portion that is opposite the first surface, thereby generating the haptic feedback towards the appendage so as to be perceived by the user.

11. The wearable haptic device of claim 10, further comprising:
a preload tensioning mechanism configured to cause the enclosure to apply an amount of preload to the haptic feedback component via the appendage.

12. The wearable haptic device of claim 10, further comprising:
a wireless antenna configured for receiving a haptic feedback preference from an electronic device that is distinct from the wearable haptic device, wherein the controller is configured to form a modified feedback parameter based on the feedback parameter and the haptic feedback preference.

13. The wearable haptic device of claim 10, wherein the haptic feedback element comprises a piezoelectric element and wherein the second portion of the haptic feedback component is to a circular flexible frame.

14. The wearable haptic device of claim 10, wherein the haptic feedback element comprises a piezoelectric element, an electroactive substrate, a magnetic assembly, a linear resonance actuator, or a voice coil.

15. The wearable haptic device of claim 10, further comprising:
a sensor that is configured to transmit a contact parameter to the controller.

16. A method for generating haptic feedback using a haptic feedback device according to movement of an appendage of a user, the method comprising:
with a controller, receiving a motion parameter from an accelerometer;
with the controller, generating a feedback parameter based on the motion parameter; and
actuating a haptic feedback element on a first surface of a first portion of a haptic feedback component to move the first portion relative to a second portion of the haptic feedback component from an initial configuration to a modified configuration so as to apply a force against the appendage of the user with an opposing second surface of the first portion, thereby generating the haptic feedback based on the motion parameter and the feedback parameter.

17. The method of claim 16, wherein the method further comprises:
receiving a haptic feedback preference; and
combining the haptic feedback preference with the motion parameter to generate the feedback parameter.

18. The method of claim 17, wherein the haptic feedback preference is received via an antenna of the haptic feedback device from an electronic device.

19. The method of claim 17, wherein the controller is configured to adjust a ratio between the motion parameter and the haptic feedback preference.

20. The method of claim 16, wherein the haptic feedback component comprises a piezoelectric element, an electroactive substrate, a magnetic assembly, a linear resonance actuator, or a voice coil.

* * * * *